(12) United States Patent
Bates et al.

(10) Patent No.: US 7,490,297 B2
(45) Date of Patent: *Feb. 10, 2009

(54) WINDOW SCROLL BAR

(75) Inventors: Cary Lee Bates, Rochester, MN (US); Paul Reuben Day, Rochester, MN (US); Jeffrey Michael Ryan, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

This patent is subject to a terminal disclaimer.

(21) Appl. No.: 10/431,926

(22) Filed: May 8, 2003

(65) Prior Publication Data
US 2003/0193524 A1 Oct. 16, 2003

Related U.S. Application Data

(62) Division of application No. 09/276,204, filed on Mar. 25, 1999, now Pat. No. 6,590,594.

(51) Int. Cl.
*G06F 3/048* (2006.01)

(52) U.S. Cl. ............... 715/784; 715/781; 715/786; 715/787; 715/764; 715/804

(58) Field of Classification Search ......... 715/781, 715/784–788, 789, 764, 804
See application file for complete search history.

(56) References Cited

U.S. PATENT DOCUMENTS

| | | | |
|---|---|---|---|
| 5,390,295 A | 2/1995 | Bates et al. | |
| 5,412,776 A | 5/1995 | Bloomfield et al. | |
| 5,602,997 A * | 2/1997 | Carpenter et al. | 715/764 |
| 5,623,679 A * | 4/1997 | Rivette et al. | 715/526 |
| 5,767,835 A | 6/1998 | Obbink et al. | |
| 5,809,318 A | 9/1998 | Rivette et al. | |
| 5,825,349 A | 10/1998 | Meier et al. | |
| 5,867,678 A | 2/1999 | Amro et al. | |
| 5,903,267 A | 5/1999 | Fisher | |
| 5,999,176 A | 12/1999 | Kamper | |
| 6,020,887 A | 2/2000 | Loring et al. | |
| 6,025,841 A | 2/2000 | Finkelstein et al. | |
| 6,215,490 B1 * | 4/2001 | Kaply | 715/788 |
| 6,246,407 B1 | 6/2001 | Wilks et al. | |
| 6,522,342 B1 * | 2/2003 | Gagnon et al. | 715/716 |

* cited by examiner

*Primary Examiner*—Simon Ke
(74) *Attorney, Agent, or Firm*—Owen J. Gamon; Roy W. Truelson

(57) ABSTRACT

A method, system, and program product for generating a window scroll-bar. In the preferred embodiment, a controller displays the window scroll-bar on a display screen. The window scroll-bar contains sections associated with respective windows on the display. The window scroll-bar also contains a slider, which moves within a section and between sections. As the slider moves within a particular section, the window associated with that section moves on the display toward the nearest boundary of the display. Thus, by moving the window scroll-bar slider, the user can move overlapping windows out of the way and find the window of interest.

8 Claims, 21 Drawing Sheets

US 7,490,297 B2

WINDOW SCROLL BAR

CROSS REFERENCE TO RELATED APPLICATION

This is a divisional application of U.S. patent application Ser. No. 09/276,204, filed Mar. 25, 1999, now U.S. Pat. No. 6,590,594 entitled "WINDOW SCROLL BAR", which is herein incorporated by reference.

FIELD OF THE INVENTION

The present invention relates in general to improved information processing systems. In particular, the present invention relates to a method and system for the generation of a window scroll-bar.

BACKGROUND

Early computer systems were controlled by batch operating systems. These systems had limited interaction with users of the system. An operator needed to load the job to be run and then send the output to a printer. With the advent of time-sharing operating systems, such as the IBM System 370, interactive computing became the norm. Time-sharing operating systems allowed many users to use the computer's resources simultaneously, so that all users appeared to have their own computer system. All users had their own terminal, which was connected to the central computer system. This terminal typically consisted of a display and a keyboard. To the user, this terminal appeared to be an interactive computer system in its own right.

With the advent of computer systems that allowed truly interactive computer applications came a proliferation of user interfaces. Some of these interfaces were command driven, others where menu driven, but they all allowed the user to work on only one task or application from a given terminal at a time.

Today, the state-of-the-art for computer systems and user interfaces has advanced beyond the single-task interface. Inexpensive, personal computers and workstations with powerful, graphics processors and multi-tasking, operating systems have changed the way users interact with computer systems. With these operating systems, the user can simultaneously work on many tasks at once, each task being confined to its own display panel, called a window. This interface allows the presentation of multiple windows in potentially-overlapping relationships on a display screen. The user can thus retain a window on the screen while temporarily superimposing a further window entirely or partially overlapping the retained window. This enables users to divert their attention from a first window to one or more secondary windows for assistance and/or reference, so that overall user interaction can be improved. There can be many windows with active applications running at once. As the number of open windows becomes large and the screen becomes cluttered, it becomes more and more difficult for the user to find the desired window because it may be overlaid by several other windows.

In order to find the desired window, current systems allow the user to reduce overlying windows to icons (symbols that represent the windows) by clicking the mouse button while the mouse cursor is positioned on a minimize button. Reducing a window to an icon is sometimes called "minimization". This method suffers from the disadvantage that when the window is reduced to an icon, the user cannot see the window contents. Many times when an application in a window is running, the user might wish to see the window contents. By seeing all or a portion of the window contents, the user has a better chance of determining when the application is complete or needs attention.

In an attempt to address these problems of minimization, some operating systems create a "task bar", which contains icons for all running tasks. The task bar is always present, regardless of the amount of space that the windows take up on the remaining area of the desktop. The task bar contains icons for all running tasks, regardless of whether the tasks are minimized, maximized, or take up some portion of the desktop. When the user selects an icon in the task bar, the operating system brings that task to the foreground of the desktop. The task bar suffers from the problem that it is an all-or-nothing solution; that is, in order to determine the contents of the window, the user must bring the entire window to the foreground. Further, the user might not be able to determine which is the desired window by examining the icons in the task bar, and thus may repeatedly need to bring different windows to the foreground in order to find the desired window.

Another method of finding the desired window is for the user to operate the mouse pointer to "grab" overlying windows, "drag" them, and "drop" them to the side or partially off the screen. In this method, the user positions the mouse pointer in some portion of the window (such as the title bar) and clicks and holds a mouse button (the grabbing action). The window then moves with the mouse pointer (the dragging action). When the window is positioned in the desired area, the user releases the mouse button (the dropping action). Grabbing, dragging, and dropping take too much of the user's time and divert the user's attention from the primary work inside the desired window.

For the foregoing reasons, there is a need for a windowing interface that permits the user to quickly and easily find the window of interest amidst the clutter of the desktop.

SUMMARY OF THE INVENTION

The invention is a method and system for generating a window scroll-bar. In the preferred embodiment, a controller displays the window scroll-bar on a display screen. The window scroll-bar contains sections associated with respective windows on the display. The window scroll-bar also contains a slider, which moves within a section and between sections. As the slider moves within a particular section, the window associated with that section moves on the display toward the nearest boundary of the display. Thus, by moving the window scroll-bar slider, the user can move overlapping windows out of the way and find the window of interest.

DESCRIPTION OF THE PREFERRED EMBODIMENT

Figure 1:
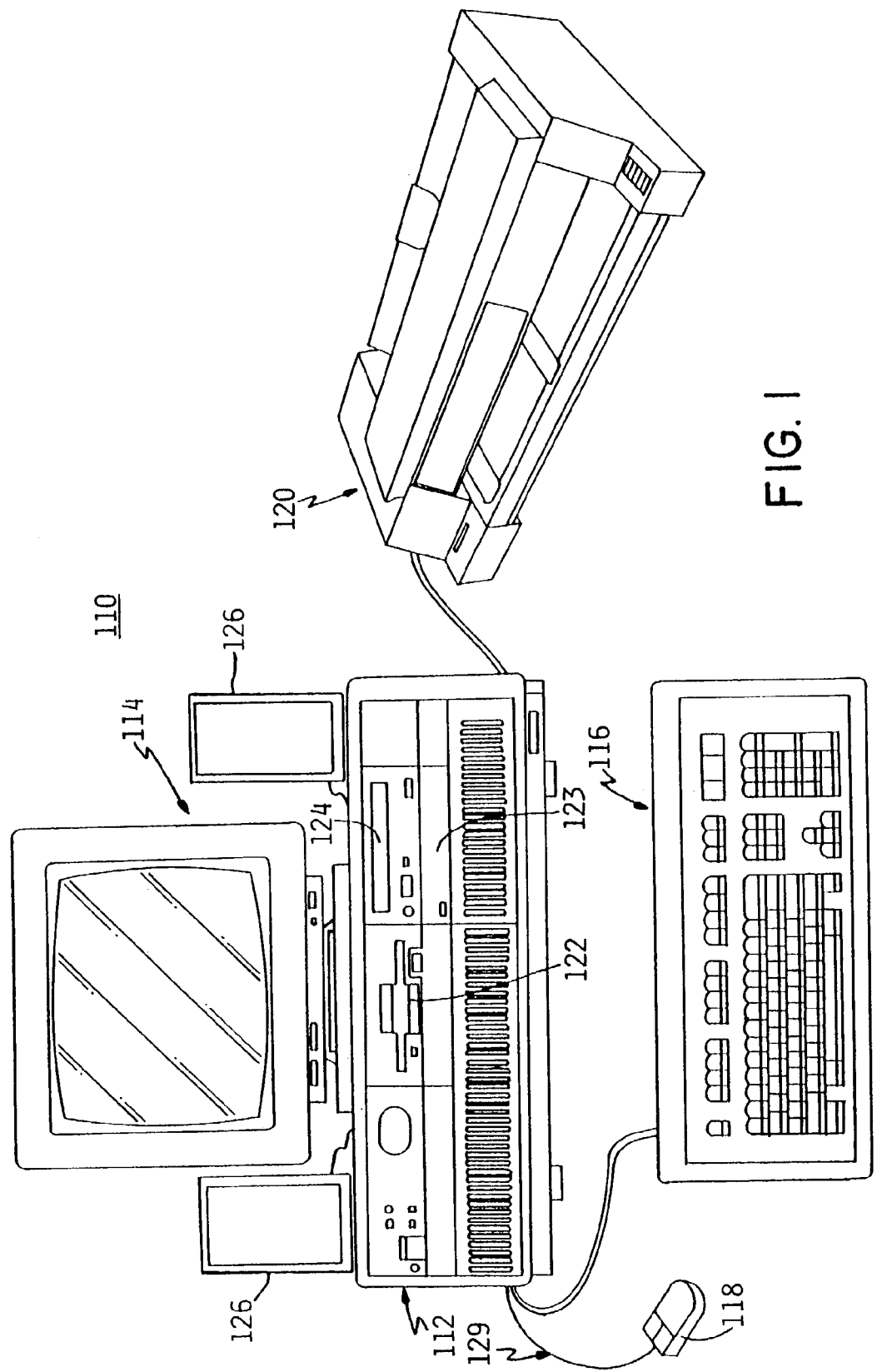
FIG. 1 is a pictorial representation of a computer system that can be utilized to implement a preferred embodiment.

With reference now to the figures and in particular with reference to FIG. 1, there is depicted an embodiment of a computer system that can be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a "QWERTY" pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video-display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video-display terminal 114 can be replaced with a liquid crystal display (LCD) based or gas, plasma-based, flat-panel display.

Pointing device 118 is preferably utilized in conjunction with a graphical user-interface (GUI) in which hardware components and software objects are controlled through the selection and the manipulation of associated, graphical objects displayed within display device 114. Although computer system 110 is illustrated with a mouse for pointing device 118, other graphical-pointing devices such as a graphic tablet, joystick, track ball, touch pad, or track pad could also be utilized. Pointing device 118 features a casing with a flat bottom that can be gripped by a human hand. Pointing device 118 can include buttons on the top, a multi-directional-detection device such as a ball on the bottom, and cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112, and which are further described below under the description for FIG. 2.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows the display of windows, regardless of whether the computer system is a complicated, multi-user computing apparatus, a single-user workstation, or a network appliance that does not have non-volatile storage of its own.

Figure 2:
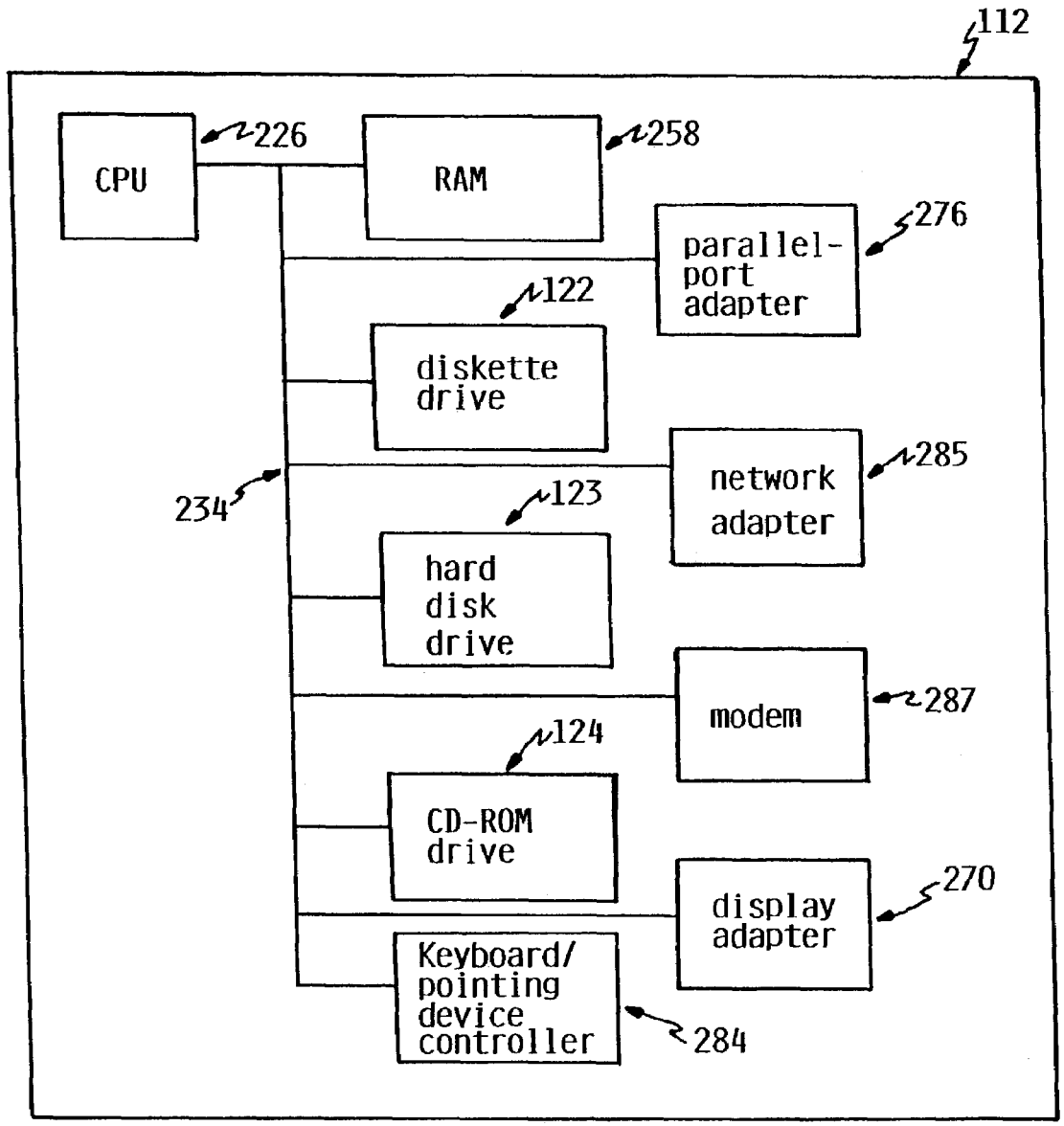
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented as one of the 80×86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual, volatile-memory modules that store segments of operating system and application software while power is supplied to computer system 110. The software segments are partitioned into one or more virtual-memory pages that each contain a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
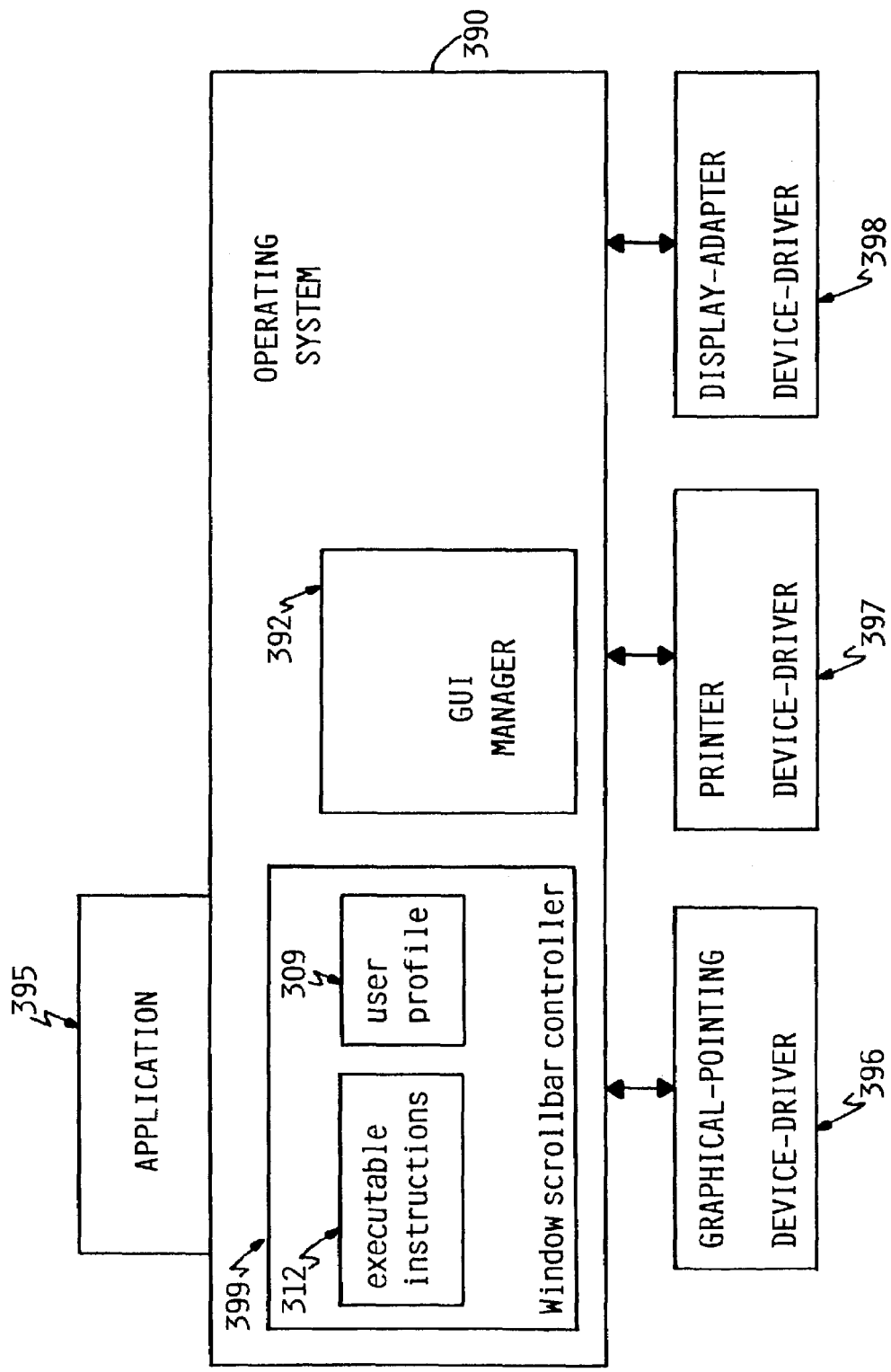
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. Other technologies also could be utilized, such as touch-screen technology or human-voice control. The operating system is the foundation upon which applications 395, such word-processing, spreadsheet, and web-browser programs are built.

In accordance with the preferred embodiment, operating system 390 includes graphical-user-interface (GUI) 392 manager although they could be packaged separately. GUI 392 manages the graphical user-interface with which a user of computer system 110 interacts.

Operating system 390 also includes window scroll-bar controller 399. Window scroll-bar controller 399 contains executable instructions 312 and user profile 309. Although window scroll-bar controller 399 is drawn as being included in operating system 390, they could be packaged separately. User profile 309 contains information that the user can set to direct the operation of window scroll-bar controller 399. User profile 309 is further described below under the description of FIG. 5. Referring again to FIG. 3, CPU 226 is suitably programmed to carry out the preferred embodiment by executable instructions 312, as described in more detail in the flowcharts of FIGS. 12-19. In the alternative, the functions of FIGS. 12-19 could be implemented by control circuitry through the use of logic gates, programmable-logic devices, or other hardware components in lieu of a processor-based system.

Operating system 390 communicates with applications 395 through messages conforming to the syntax of the application-program interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

Figure 4:
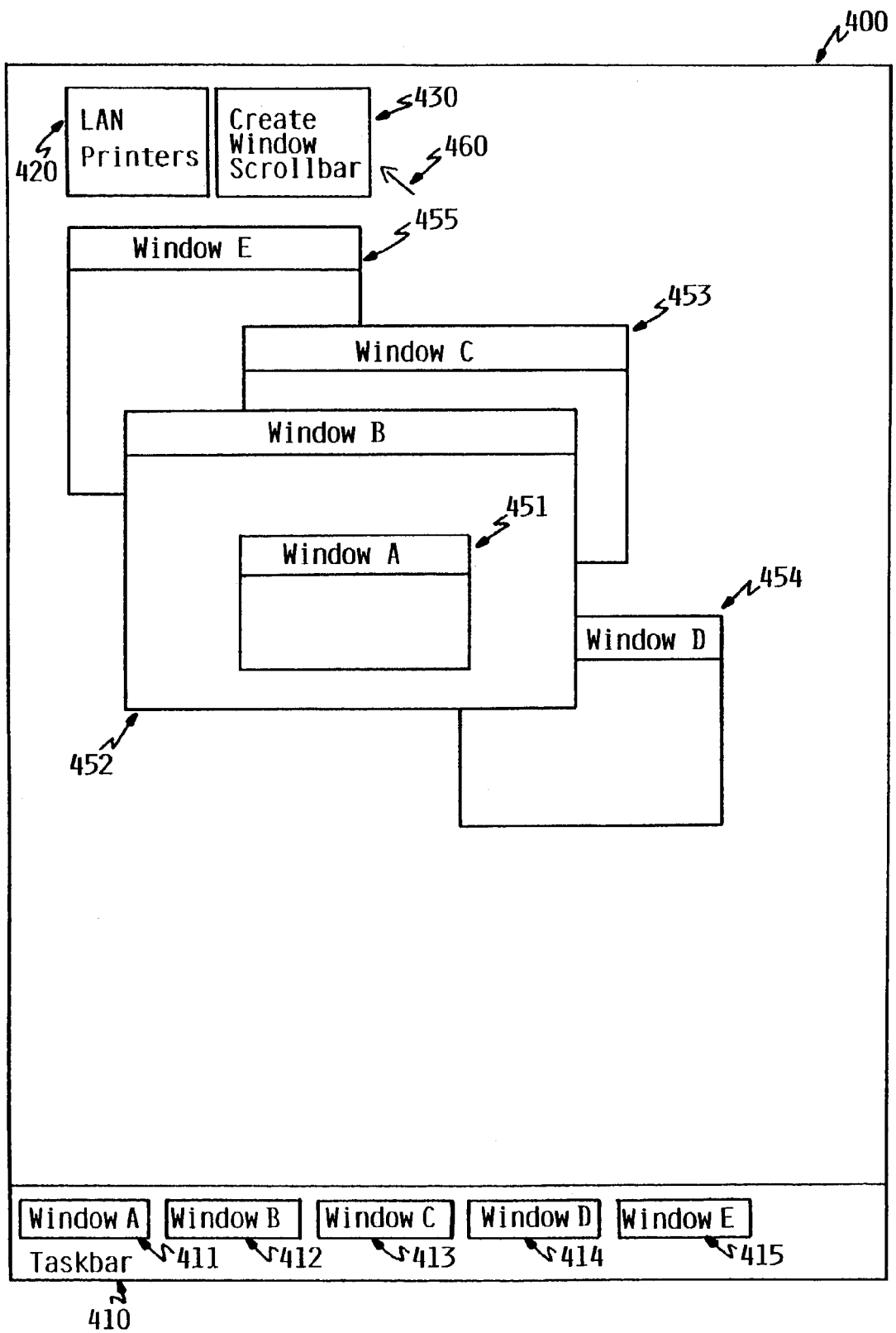
FIGS. 4, 5, 6, 7, 8, 9, 10, and 11 are pictorial representations of the interfaces that a user can operate to control the operation of a preferred embodiment.

FIGS. 4-11 illustrate pictorial representations of the interfaces that are used to control the operations of the preferred embodiment. Referring to FIG. 4, there is shown desktop 400 displayed on display 114. Desktop 400 includes task bar 410, which contains icons 411, 412, 413, 414, and 415, which correspond to active windows 451, 452, 453, 454, and 455, respectively. Also contained within desktop 400 are icons LAN printers 420 and create-window scroll-bar 430. When the user selects create-window scroll-bar 430 using pointing-device pointer 460, controller 399 displays the dialog shown in FIG. 5, below, and creates a window scroll-bar as further described below in FIGS. 6-11, and 12.

Figure 5:
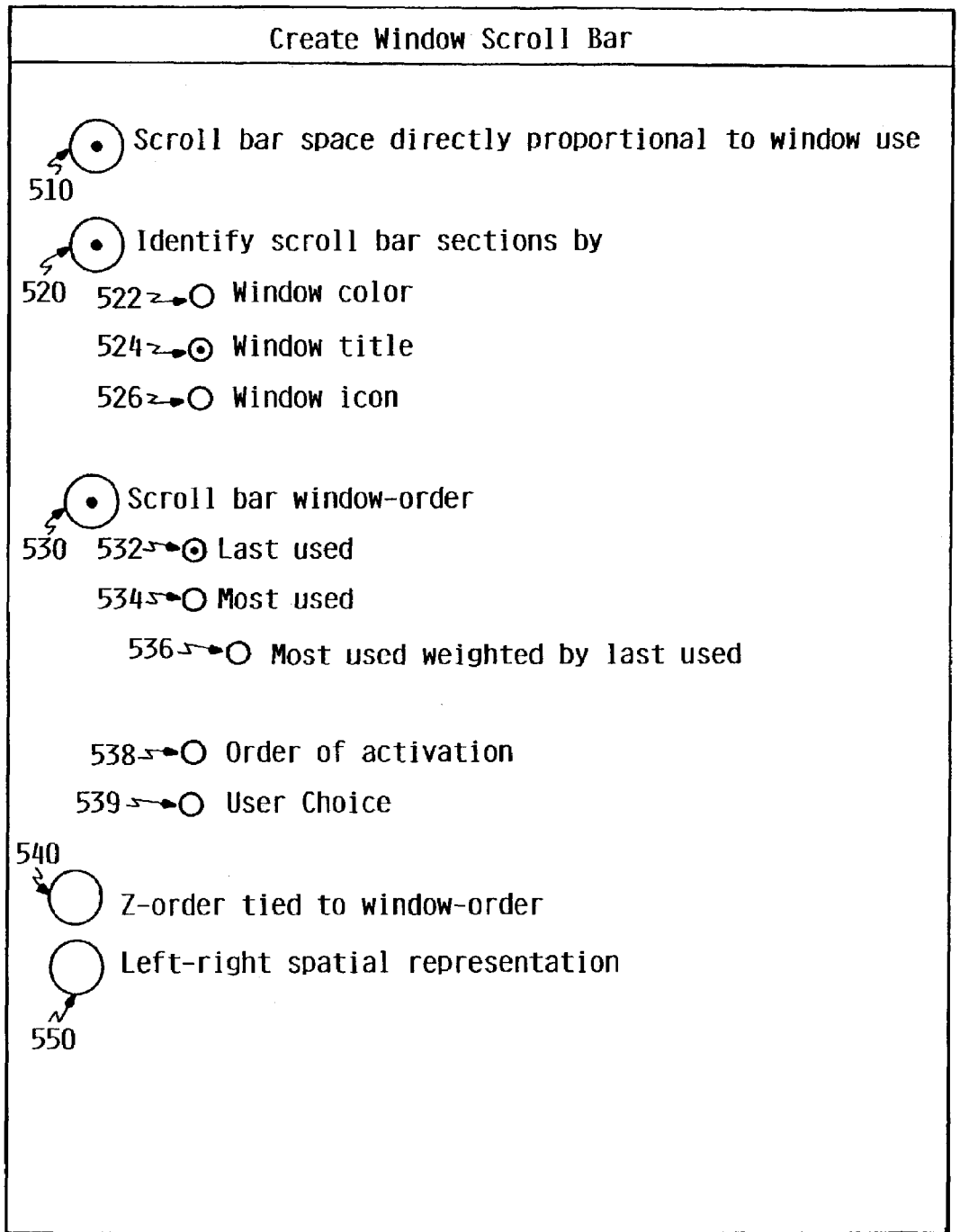

Referring to FIG. 5, there is illustrated create-window scroll-bar dialog 500, which controller 399 displays and processes in response to the user selecting create-window scroll-bar 430, as previously described above under the description for FIG. 4. Controller 399 stores the user-selected options described by dialog 500 in user profile 309. Referring again to FIG. 5, dialog 500 contains proportional-space button 510, identify-sections button 520, scroll-bar window-order button 530, z-order button 540, and left-right spatial-representation button 550.

When the user selects button 510, controller 399 creates a window scroll-bar on the desktop such that each displayed window has a section on the scroll bar in proportion to the amount-of-use of the window. When the user selects button 520, controller 399 will identify the scroll-bar sections in the window scroll-bar by either color of the associated window 522, title of the associated window 524, or by icon of the associated window 526.

When the user selects scroll-bar window-order button 530, controller 399 orders the window sections in the scroll bar by last used 532, most used 534, most-used-weighted-by-last-used 532, order of activation 538, or by user choice 539. Last used 532 means that the windows are ordered sequentially on the scroll bar with the window that was used most recently being on the top and the window that was used least recently being on the bottom. Most used 534 means that windows are ordered on the scroll bar so that the window in which the user spent the most time is positioned at the top of the scroll bar and the window in which the user spent the least time is positioned on the bottom of the scroll bar. Most-used-weighted-by-last-used 536 means that controller 399 orders the windows on the scroll bar by balancing those windows near the top of the scroll bar that are most heavily used with those that are last used. Thus, a window that the user peeks at for a small amount of time will get less priority than one that the user spent an hour looking at. But, if the user keeps looking at the window, that window will move above the other, more heavily-used windows on the scroll bar depending on the weights in the priority algorithm used by controller 399. Order of activation 538 means that controller 399 orders the windows on the scroll bar with the window that the user activated first being placed at the top of the scroll bar and the window that the user activated last being at the bottom of the scroll bar, regardless of when the windows were last used or how heavily the windows were used. Time of "activation" refers to the time that the application associated with the window was started. Alternatively, it could refer to the time that the application was converted from an icon state to a windowed state. User choice 539 means that the user can order the windows on the window scroll-bar according to the user's preference.

Z-order tied to window-order 540 means that controller 399 will change the z-order of the windows on desktop 400 to match the order of the window sections in the window scroll-bar. "Z-order" refers to the order of the windows on the Z-axis. In a Cartesian coordinate system, the x-axis is usually thought of as being the horizontal axis, the y-axis is usually thought of as being the vertical axis and the z-axis is usually thought of as being the depth of the display screen. In the example shown in FIG. 4, z-order refers to the order of the windows on the display screen with respect with their relative depth. For example, window 451 would have the highest order within the z-order since it is displayed on top. Window 452 would be lower in the z-order, followed by window 453, and then by window 455. Just from looking at the example in FIG. 4, it is impossible to determine where window 454 would be positioned in the z-order, although it is surely below windows 452 and 451.

Left-right spatial representation 550 means that controller 399 will create a left-right window scroll-bar, as further described below under the description for FIGS. 9, 10, and 11, and FIG. 19.

Figure 6:
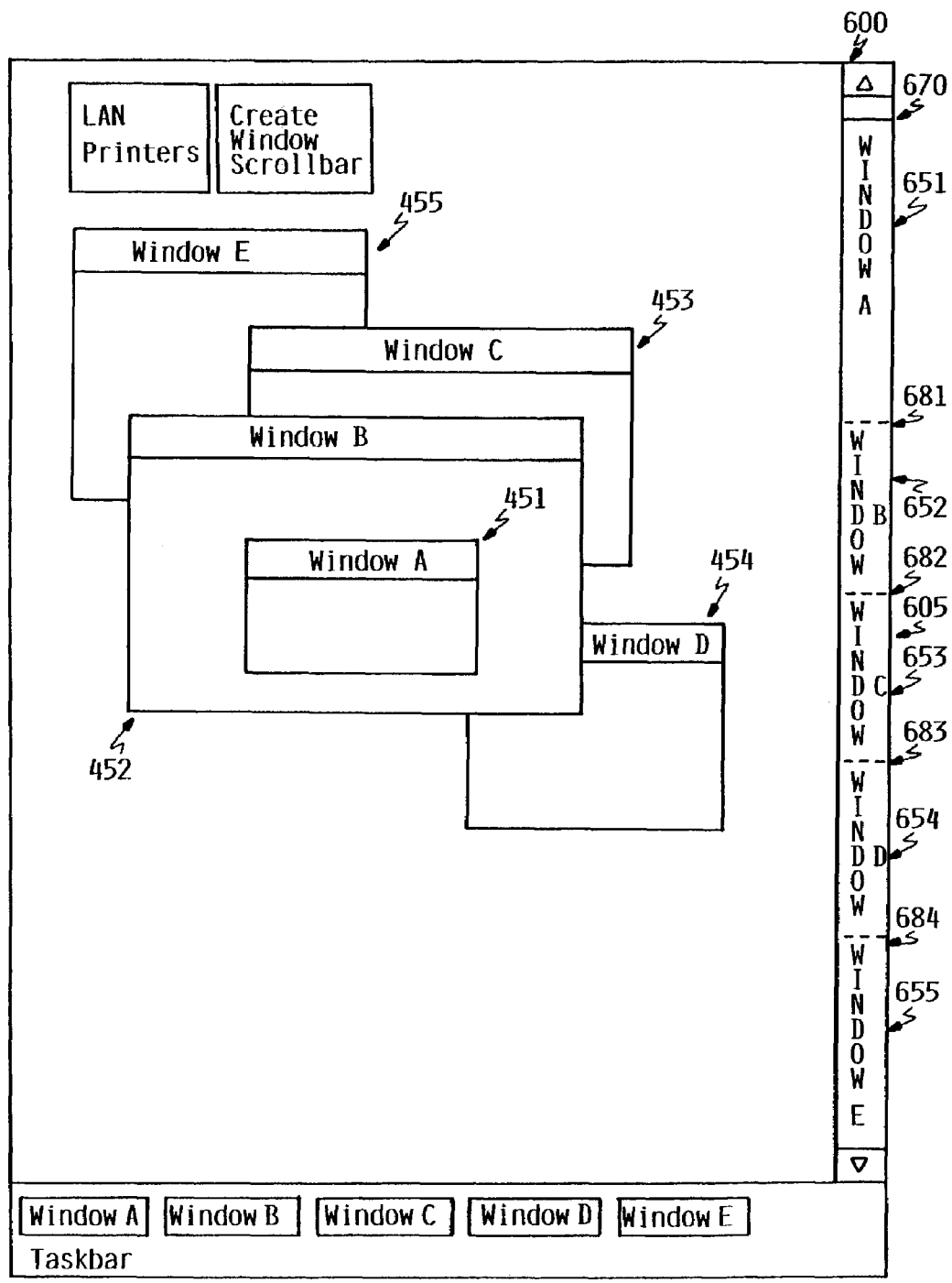

Referring to FIG. 6, there is illustrated desktop 600, which controller 399 created in response to the user selecting create window scroll-bar 430. Controller 399 created window scroll-bar 605, containing window sections 651, 652, 653, 654, and 655, corresponding to windows 451, 452, 453, 454, and 455, respectively. Controller 399 put the title of each respective window in window scroll-bar section 651-655 because the user previously selected window title 524. Controller 399 created each of window scroll-bar sections 651-655 of a different size in proportion to the user's previous use of the window because the user previously selected proportional use 510. Window section 651 is at the top of window scroll-bar 605 because window 451 was the last window to be used, and the user previously selected last used 532. Window section 655 is at the bottom of window scroll-bar 605 because window 455 was the first window to be used and the user previously selected last used 532. Controller 399 has ordered the other window sections 652, 653, and 654 based on their use. Controller 399 placed slider 670 at the top of window scroll-bar 605 and in window section 651, which is associated with window 451. Reference numerals 681, 682, 683, and 684 refer to dashed lines that represent the boundaries of window sections 651, 652, 653, 654, and 655 in window scroll-bar 605.

Figure 7:
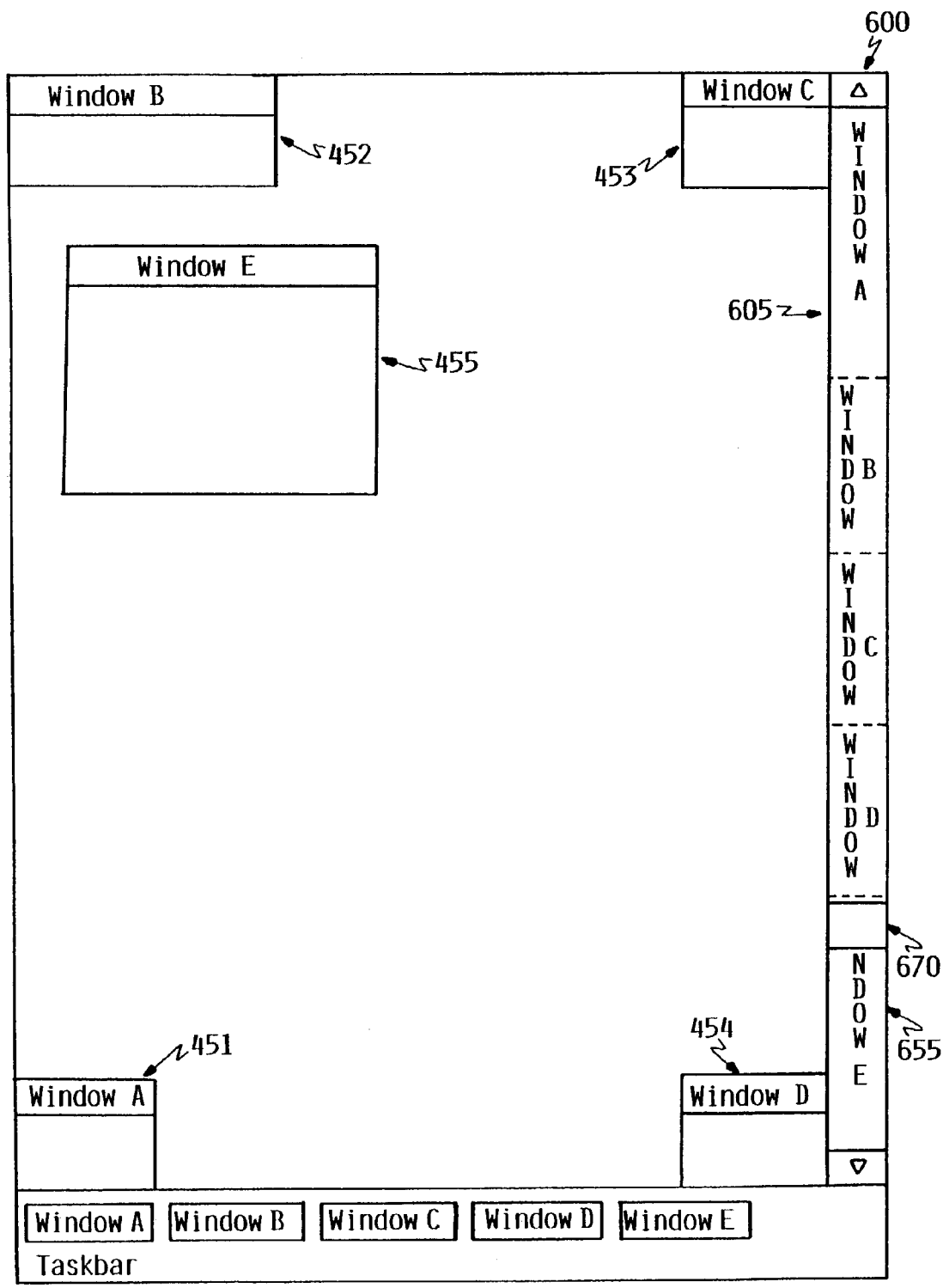

Referring to FIG. 7, in response to the user dragging slider 670 from the top of window scroll-bar 605 to its current position in window section 655, controller 399 has moved window 451 to the lower left-hand corner of desktop 600, window 452 to the upper left-hand corner of desktop 600, window 453 to the upper right-hand corner of desktop 600, and window 454 to the lower right-hand corner of desktop 600. Since slider 670 is positioned in the top of the window scroll-bar section 655, window 455 remains in the same position in desktop 600 in FIG. 7 as it was in FIG. 6. The operation of controller 399 in response to the user dragging slider 670 is further described below under the description for FIGS. 15A, 15B, 16, and 19.

Figure 8:
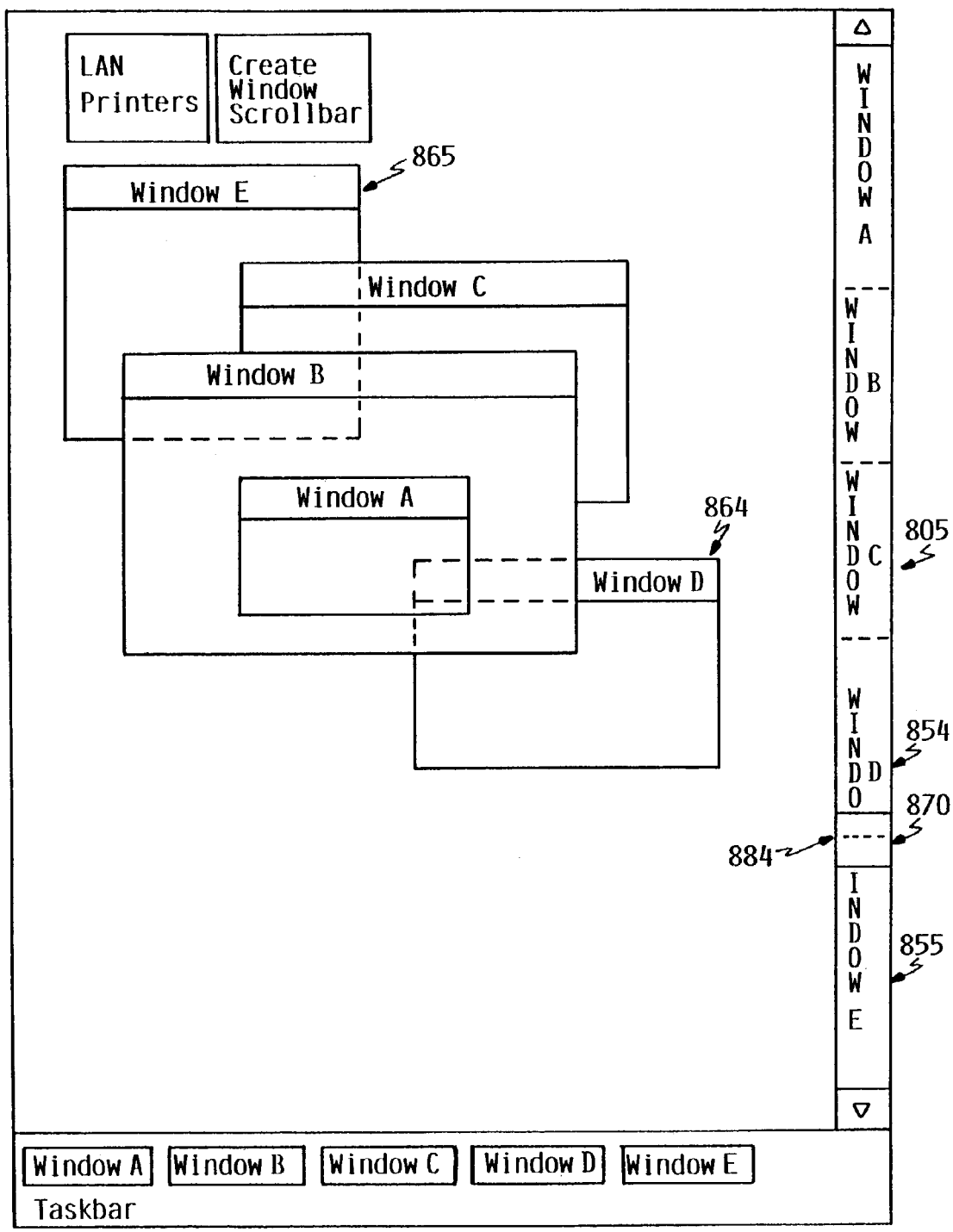

Referring to FIG. 8, there is illustrated an embodiment for controller 399, in which as the slider moves along window scroll-bar 805, controller 399 gradually fades the next window into view. Thus, in the example shown, slider 870 straddles boundary 884 between window scroll-bar sections 854 and 855. In response to this position of slider 870, controller 399 has partially displayed the contents of window 864 and window 865, as illustrated by the dashed lines. The operation of this embodiment of controller 399 is further described below in the flowcharts of FIGS. 17A, 17B and 18.

Figure 9:
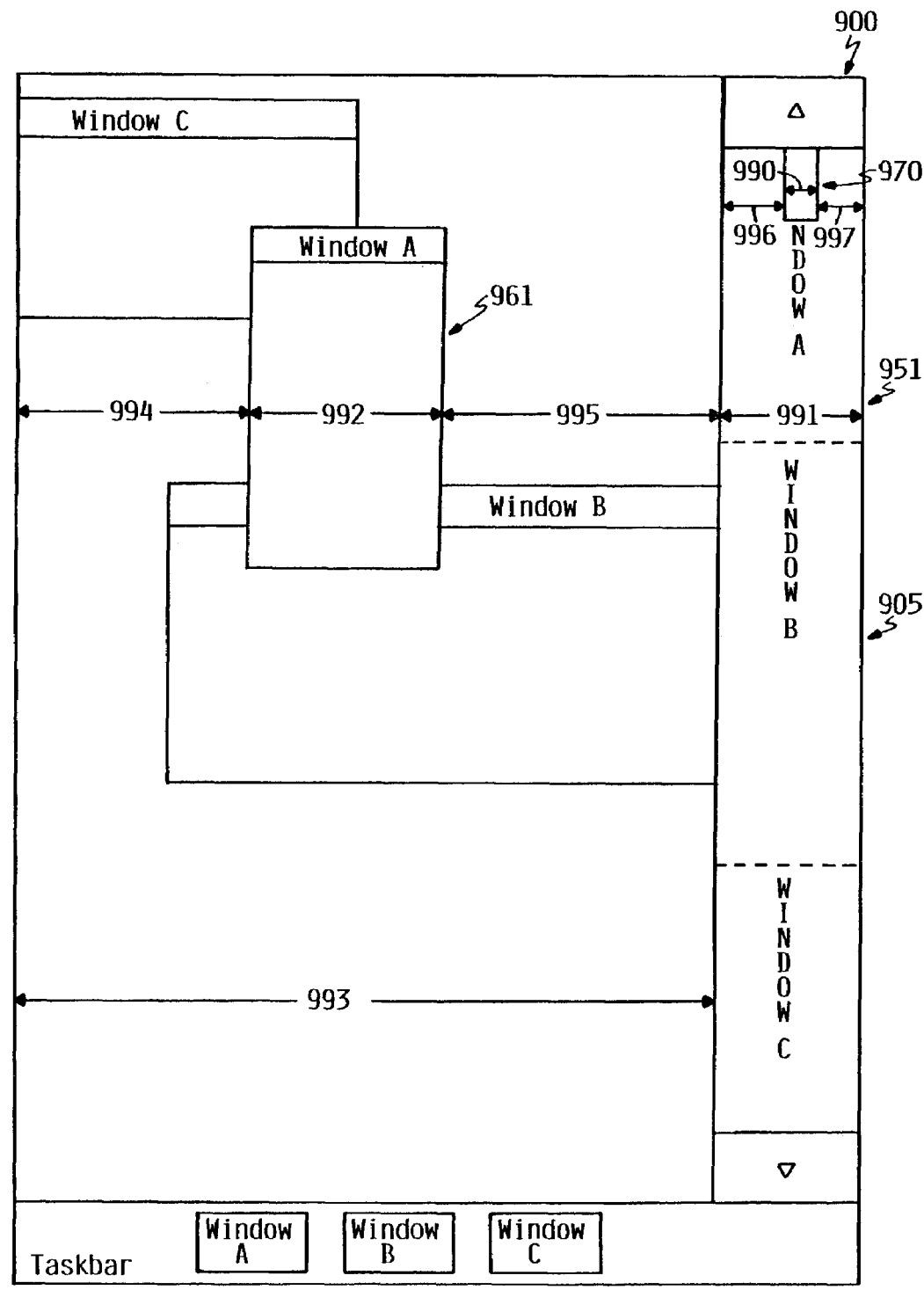
Figure 10:
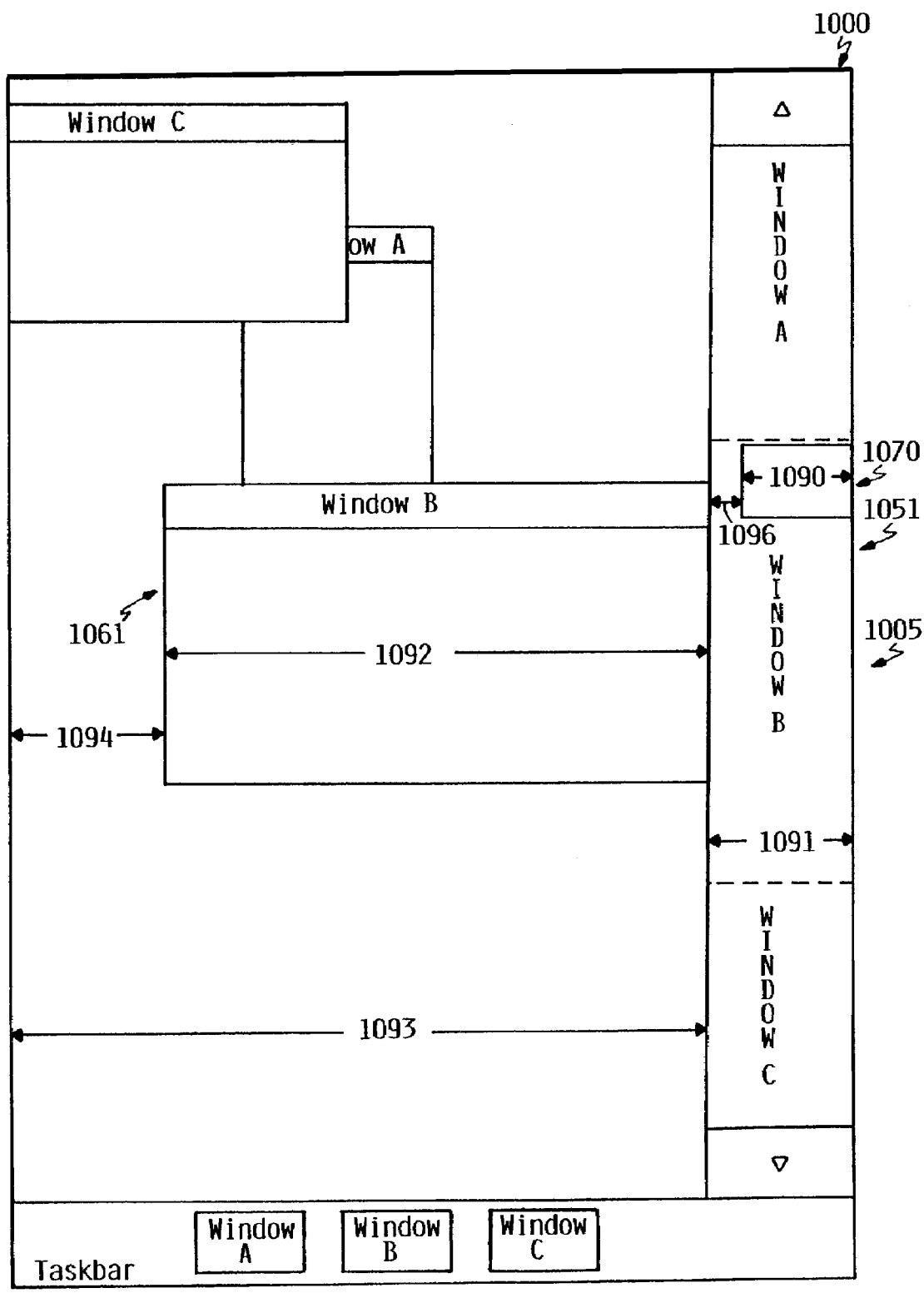
Figure 11:
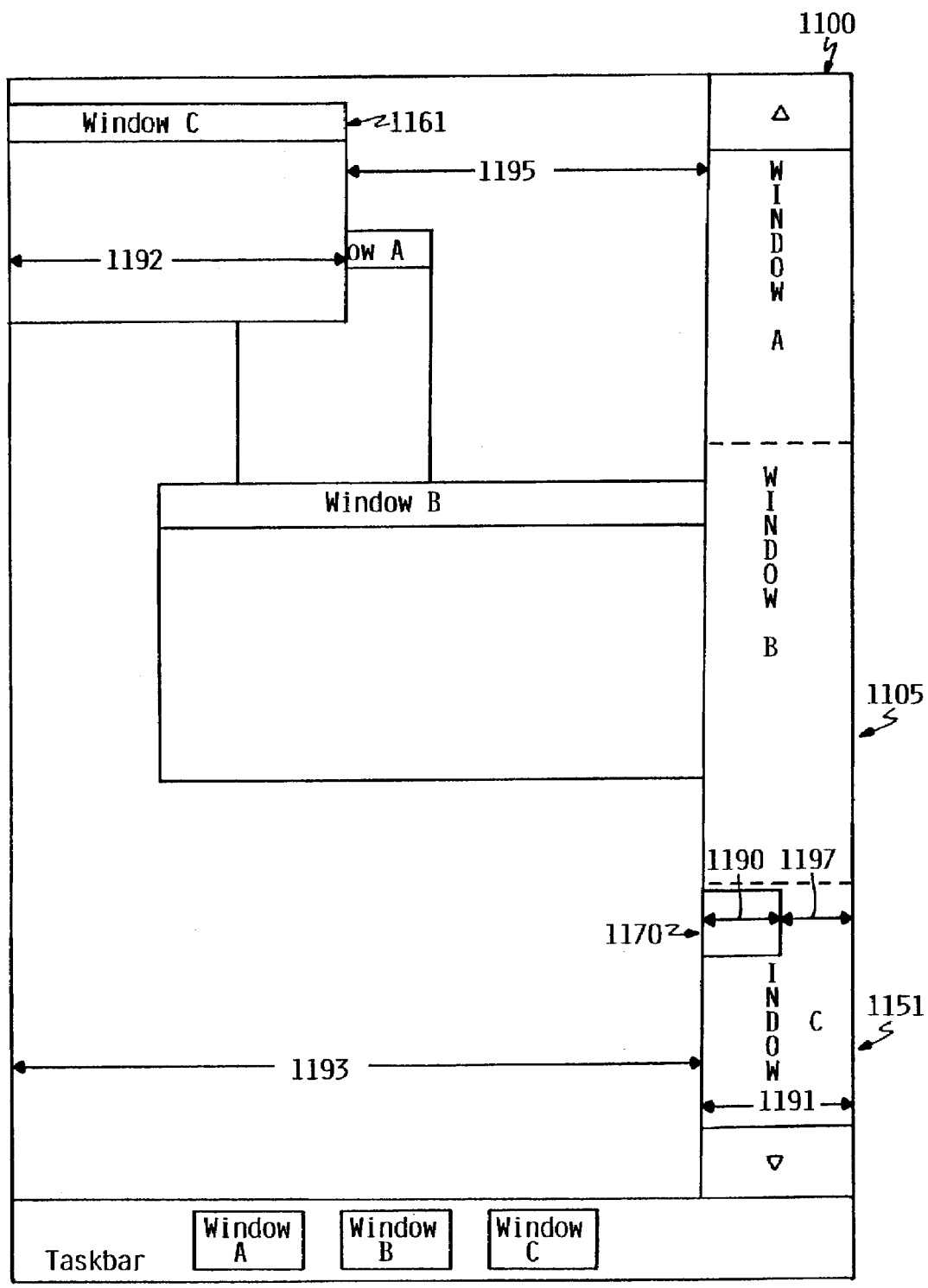

Referring to FIGS. 9, 10, and 11, there are illustrated examples of the operation of controller 399 in response to the user selecting left-right spatial representation 550. Referring to FIG. 9, controller 399 has displayed desktop 900 on display screen 114. Desktop 900 includes window scroll-bar 905. Controller 399 has positioned slider 970 within window scroll-bar section 951, which is associated with window 961. Controller 399 placed slider 970 within the middle of section 951 because window 961 is disposed horizontally in the middle of desktop 900. The ratio of width 990 to width 991 is proportional to the ratio of width 992 to width 993. Slider 970 has a width 990 that is one-quarter the width 991 of scroll bar 905 because width 992 of window 961 is one-quarter the width 993 of the displayable area of desktop 900. Distance 996 is the distance from the left edge of window scroll-bar 905 to the left edge of slider 970. Distance 997 is the distance from the right edge of slider 970 to the right edge of window scroll-bar 905. Distance 994 is the distance from the left edge of desktop 900 to the left edge of window 961. Distance 995 is the distance from the right edge of window 961 to the right edge of the displayable area of desktop 900. The ratio of distance 996 to distance 997 is proportional to the ratio of distance 994 to distance 995.

Referring to FIG. 10, controller 399 has displayed desktop 1000 and window scroll-bar 1005 on display screen 114 after the user has moved slider 1070 into window scroll-bar section 1051 associated with window 1061. Controller 399 placed slider 1070 in the right portion of window scroll-bar 1005 because window 1061 is disposed horizontally in the right portion of the displayable area of desktop 1000. Slider 1070 has a width 1090 that is three-quarters the width 1091 of scroll bar 1005 because width 1092 of window 1061 is three-quarters the width 1093 of the displayable area of desktop 1000.

Thus, the ratio of width 1090 to width 1091 is proportional to the ratio of width 1092 to width 1093. Distance 1096 is the distance from the left edge of window scroll-bar 1005 to the left edge of slider 1090. Distance 1094 is the distance from the left edge of desktop 1000 to the left edge of window 1061. The ratio of distance 1096 to distance 1091 is proportional to the ratio of distance 1094 to distance 1093.

Referring to FIG. 11, controller 399 has displayed desktop 1100 and window scroll-bar 1105 on display screen 114 after the user has moved slider 1170 into window scroll-bar section 1151 associated with window 1161. Controller 399 placed slider 1171 in the left portion of window scroll-bar 1105 because window 1161 is disposed horizontally in the left portion of the displayable area of desktop 1100. Slider 1170 has a width 1190 that is one-half the width 1191 of scroll-bar 1105 because width 1192 of window 1161 is one-half the width 1193 of the displayable area of desktop 1100. Thus, the ratio of width 1190 to width 1191 is proportional to the ratio of width 1192 to width 1193. Distance 1197 is the distance from the right edge of slider 1170 to the right edge of window scroll-bar 1105. Distance 1195 is the distance from the right edge of window 1161 to the right edge of the displayable area of desktop 1100. The ratio of distance 1197 to distance 1191 is proportional to the ratio of distance 1195 to distance 1193.

Figure 12:
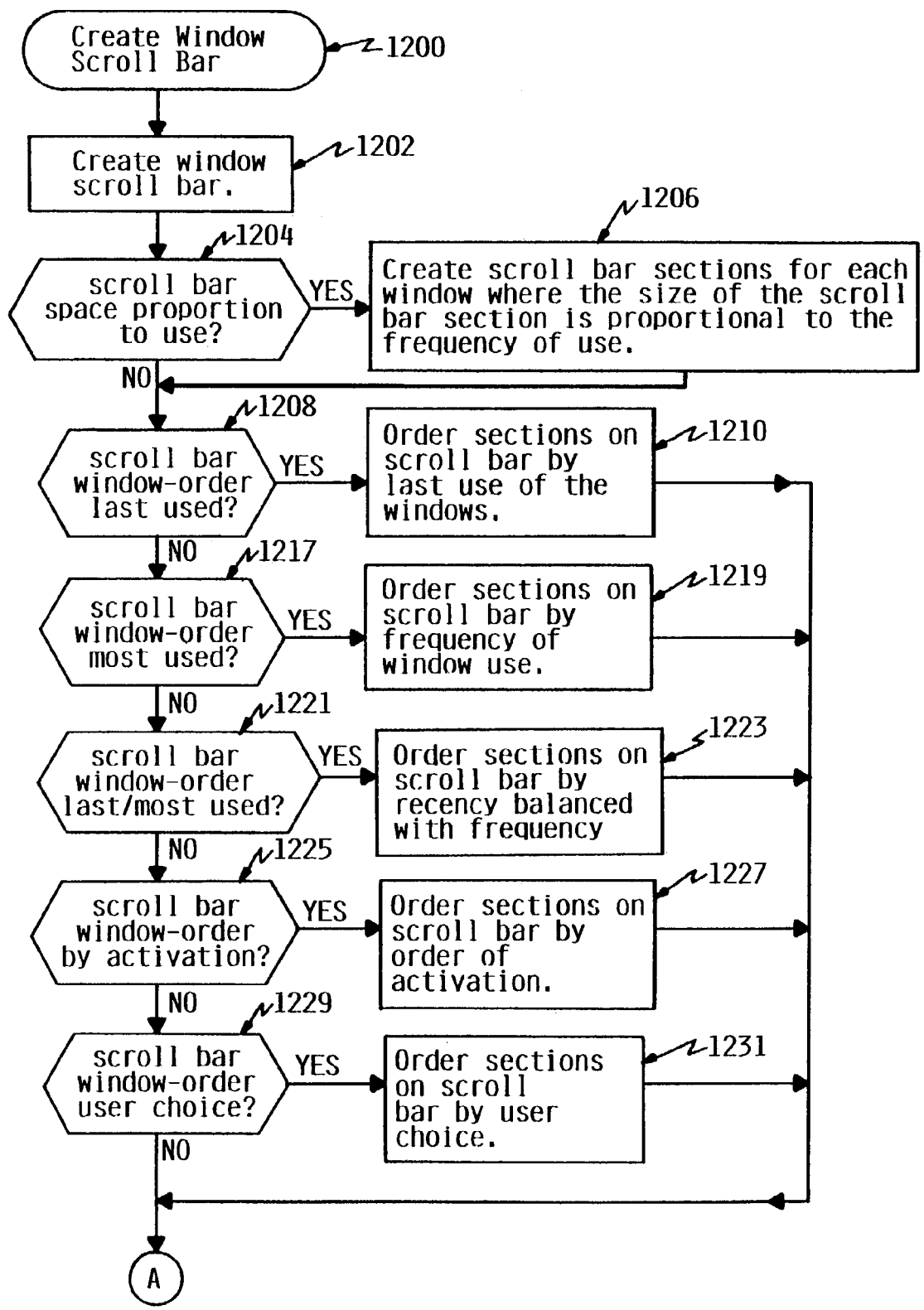
FIGS. 12, 13, 14, 15A, 15B, 16, 17A, 17B, 18, and 19 are flowcharts that describe the operation of the preferred embodiment.
Figure 13:
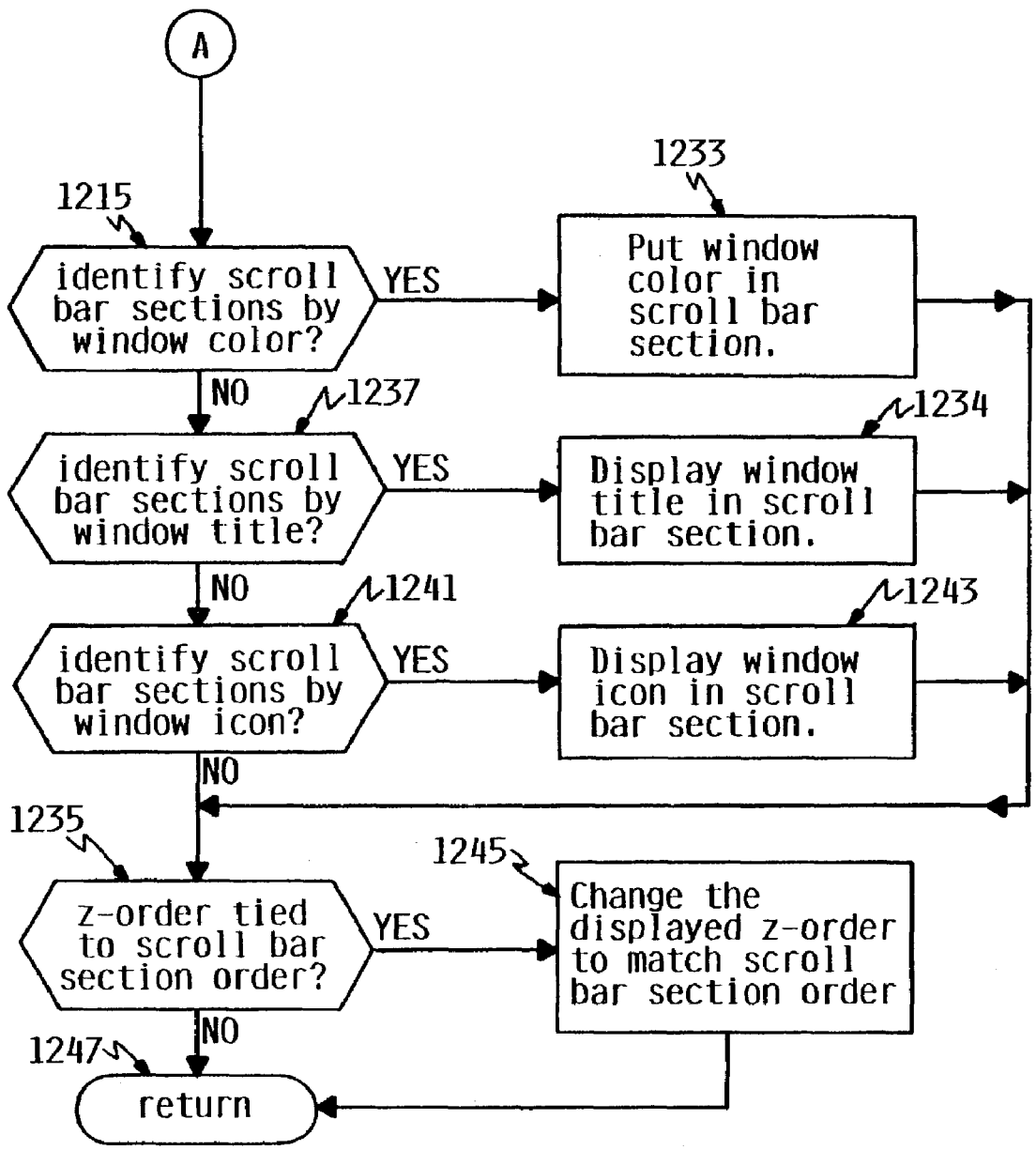

FIGS. 12-19 are flowcharts that describe the operation of the preferred embodiment. Referring to FIG. 12, there is illustrated an example of the main logic of controller 399 that creates a window scroll-bar. At block 1200, controller 399 starts. Control then continues to block 1202 where controller 399 creates the window scroll-bar on the desktop. Control then continues to block 1204 where controller 399 determines whether the user requested that the window sections in the scroll bar be directly proportional to the window use, as shown by button 510 in FIG. 5. Referring again to FIG. 12, if the determination at block 1204 is true, then control continues to 1206 where controller 399 creates the window scroll-bar sections for each window and gives each window a size on the window scroll-bar proportional to the frequency of window use. Control then continues to block 1208.

If the determination at block 1204 is false, then control continues directly to block 1208 where controller 399 determines whether the user previously requested that the scroll-bar window-order be last used as selected by button 532 in FIG. 5. Referring again to FIG. 12, if the determination at block 1208 is true, then control continues to block 1210 where controller 399 orders the window sections on the scroll bar by the last use of the windows. Control then continues to block 1215, as described below. If the determination at block 1208 is false, then control continues to block 1217 where controller 399 determines whether the user has previously selected button 534 which indicates that the order of the window sections on the scroll bar is to be sorted by most used. If the determination at block 1217 is true, then control continues to block 1219 where controller 399 orders the sections on the scroll bar by frequency of window use. Control then continues to block 1215, as described above. Control then continues to block 1215, as described below.

If the determination at block 1217 is false, then control continues to block 1221 where controller 399 determines whether the user requested that the order of the sections on the window scroll-bar be most-used-weighted-by-last-used, as illustrated by button 536 in FIG. 5. Referring again to FIG. 12, if the determination at block 1221 is true, then control continues to block 1223 where controller 399 orders the window sections on the scroll bar by recency of use balanced by frequency of use. Control then continues to block 1215, as described below.

If the determination at block 1221 is false, then control continues to block 1225 where controller 399 determines whether the user requested that the window sections on the scroll bar be ordered by activation, as illustrated by button 538 in FIG. 5. Referring again to FIG. 12, if the determination at block 1225 is true, then control continues to block 1227 where controller 399 orders the sections on the window scroll-bar by order of window activation. Control then continues to block 1215, as described below.

If the determination at block 1225 is false, then control continues to block 1229 where controller 399 determines whether the sections on the window scroll-bar are to be ordered by user choice, as indicated by button 539 in FIG. 5. Referring again to FIG. 12, if the determination at block 1229 is true, then control continues to block 1231 where controller 399 orders the sections on the window scroll-bar by user choice. Control then continues to block 1215, as described below.

If the determination at block 1229 is false, then control continues directly to block 1215 where controller 399 determines whether the user requested that window sections in the scroll bar be identified by window color, as illustrated by button 522 in FIG. 5. Referring again to FIG. 13, if the determination at block 1215 is true, then control continues to block 1233 where controller 399 paints the respective window sections in the window scroll-bar with the colors of their associated, respective windows. Control then continues to block 1235, as described below.

If the determination at block 1215 is false, then control continues to block 1237 where controller 399 determines whether the user requested that the window scroll-bar sections be identified by window title. If the determination at block 1237 is true, then control continues to block 1239 where controller 399 displays the title associated with the various windows in their respective, window scroll-bar sections. Control then continues to block 1235, as described below.

If the determination at block 1237 is false, then control continues to block 1241 where controller 399 determines whether the user requested that the window scroll-bar sections be identified by window icon, as illustrated by button 526 in FIG. 5. Referring again to FIG. 13, if the determination at block 1241 is true, then control continues to block 1243 where controller 399 displays the window icons associated with each window in their respective, window scroll-bar section. Control then continues to block 1235, as described below.

If the determination at block 1241 is false, then control continues directly to block 1235 where controller 399 determines whether the user requested that the z-order of the windows in the desktop be tied to the window scroll-bar section order. If the determination at block 1235 is true, then control continues to block 1245 where controller 399 changes the displayed z-order of the windows in the desktop to match the window scroll-bar section order. Control then continues to block 1247 where the function returns.

If the determination at block 1235 is false, then control continues directly to block 1247 where the function returns.

Figure 14:
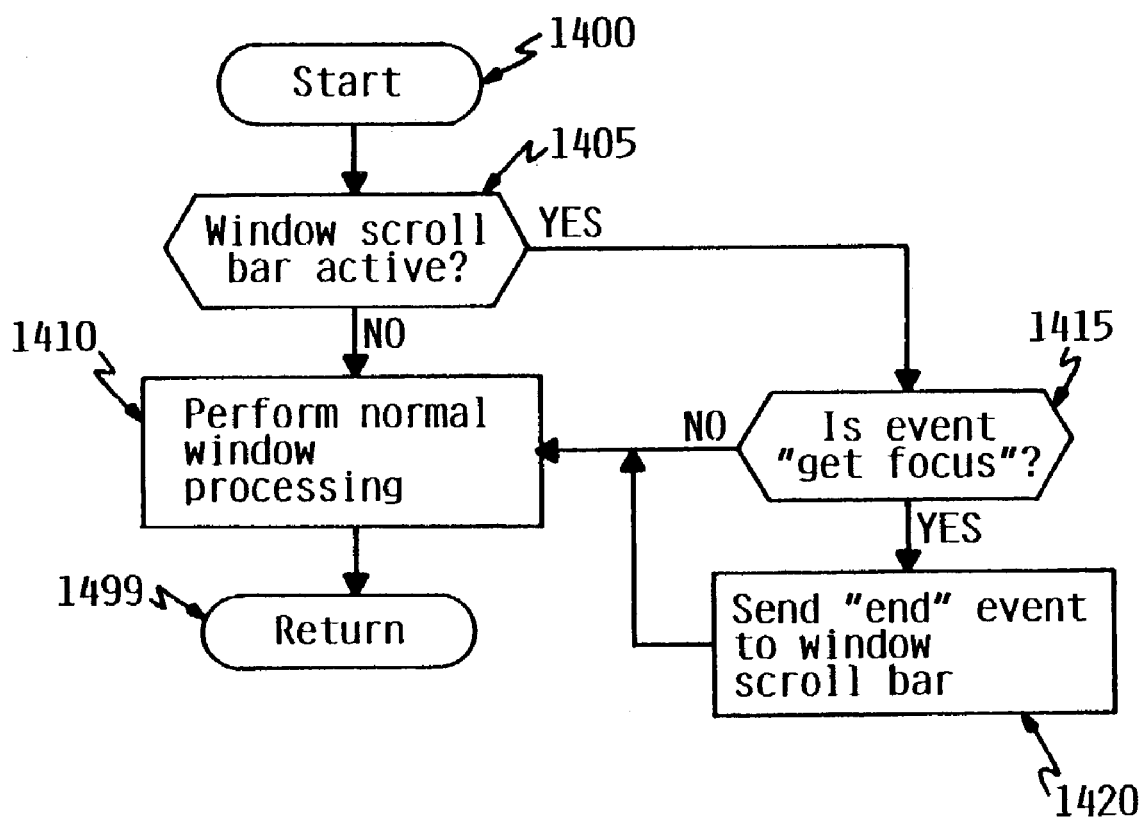

Referring to FIG. 14, there is illustrated a flowchart for a function in controller 399 that responds to window events that the application running in the window does not handle. When the window application receives an event that it does not handle, the window application sends it to a system-supplied routine, which is often called the default window procedure. FIG. 14 illustrates a flowchart for logic to handle events related to the window scroll-bar and would be executed as part of the default window procedure. Referring to block

1400, control begins. Control then continues to block 1405 where controller 399 determines whether there is an active window scroll-bar. If the determination at block 1405 is false, then control continues to block 1410 where controller 399 performs the standard processing for unknown window events. Control then controller to block 1499 where the function returns.

If the determination at block 1405 is true, then control continues to block 1415 where controller 399 determines whether the event received is a "get focus" event. A "get focus" event can be caused by the user requesting that the window that receives the "get focus" event be brought to the foreground and be ready for user interaction. If the determination at block 1415 is false, then control continues to block 1410 as previously described above.

Figure 15A:
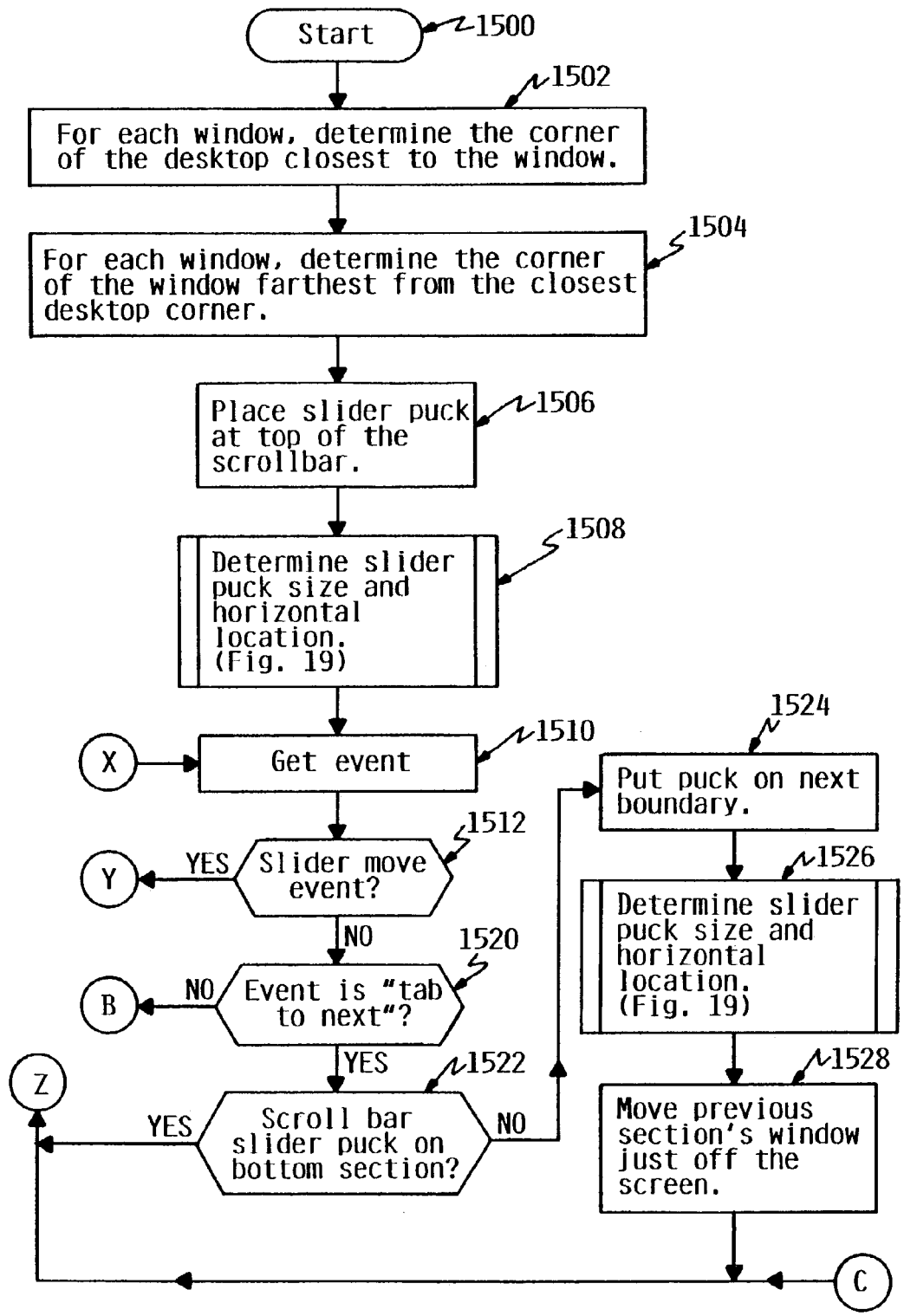
Figure 15B:
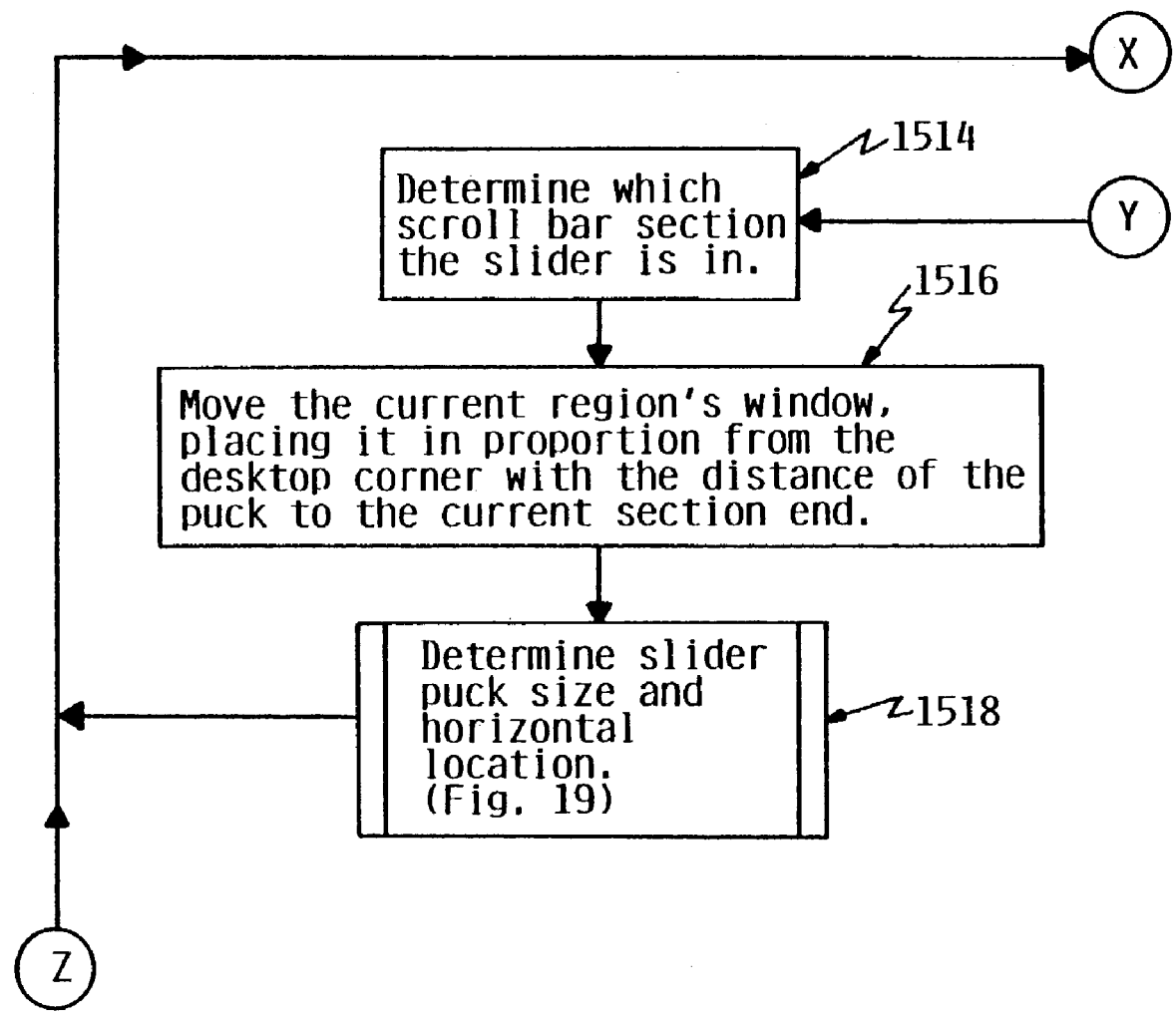
Figure 16:
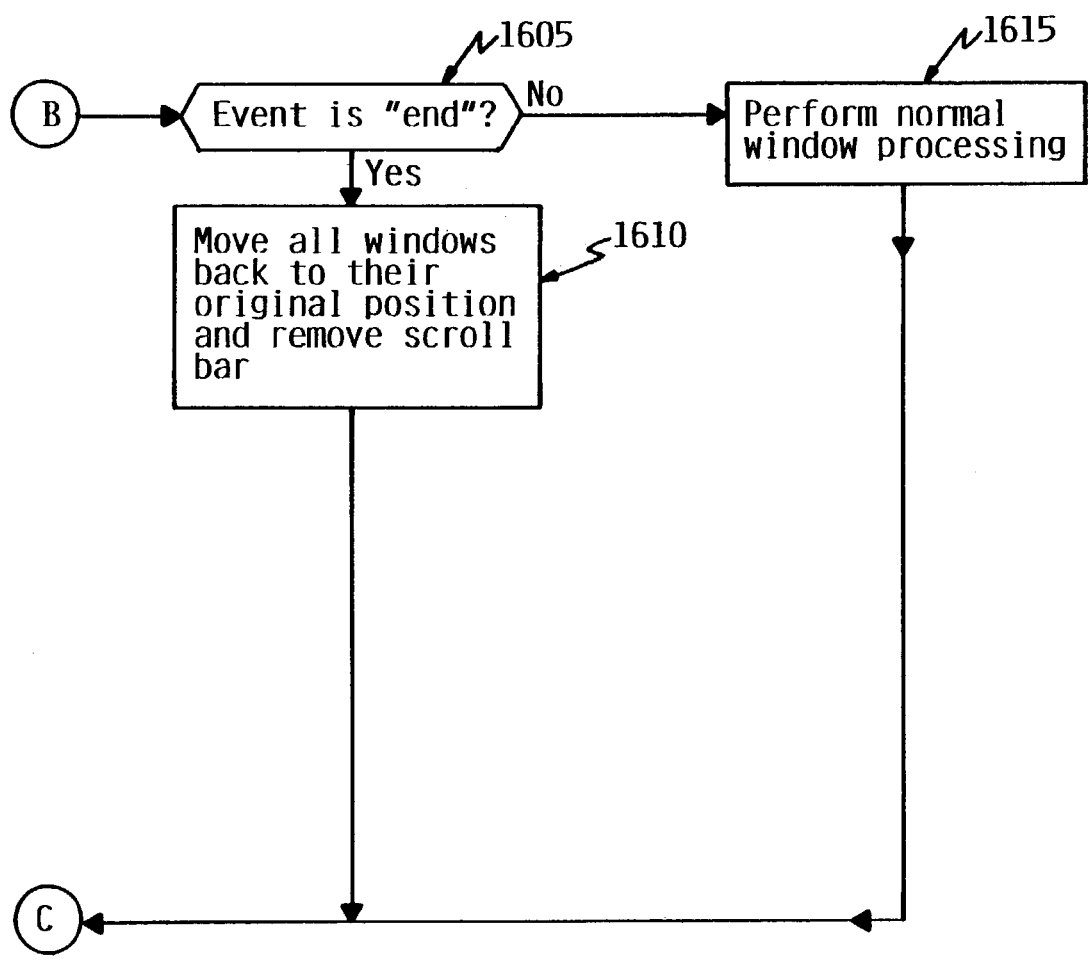

If the determination at block 1415 is true, then control continues to block 1420 where controller 399 sends an "end" event to the logic represented by FIGS. 15 and 16. Control then continues to block 1410, as previously described above.

Referring to FIGS. 15A, 15B and 16, there are illustrated flowcharts that respond to events associated with the window scroll-bar. Control begins at block 1500. Control then continues to block 1502 where controller 399 determines, for each window active on the desktop, which corner of the desktop is closest to that window. Control then continues to block 1504 where controller 399 determines, for each window, which corner of the window is farthest from the closest desktop corner. In an alternative embodiment, controller 399 uses any boundary of the window, which might or might not be a corner of the window. For example, controller 399 could use the nearest horizontal or vertical boundary, or if the desktop is circular or oval in shape, controller 399 could determine the nearest edge of the desktop from the window. Control then continues to block 1506 where controller 399 positions the slider at the top of the window scroll-bar. Control then continues to block 1508 where controller 399 determines the horizontal slider location and size, as described below under the description for FIG. 19. Control then continues to block 1510 where controller 399 gets the next event. Control then continues to block 1512 where controller 399 determines whether the event is a slider-move event.

If the determination at block 1512 is true, then control continues to block 1514 where controller 399 determines which window scroll-bar section contains the slider. Control then continues to block 1516 where controller 399 moves the window associated with the region determined above in block 1514 and places the window in proportion from the desktop corner with the distance of the slider to the current section's end. Control then continues to block 1518 where controller 399 determines the slider size and horizontal location within the window scroll-bar, as described below under the description for FIG. 19. Referring again to FIG. 15A, control then returns to block 1510, as previously described above.

If the determination at block 1512 is false, then control continues to block 1520 where controller 399 determines whether the event received at block 1510 is a "tab to next" event. If the determination at block 1520 is true, then control continues to block 1522 where controller 399 determines whether the slider is positioned in the bottom section of the window scroll-bar. If the determination at block 1522 is true, then control returns to block 1510, as previously described above.

If the determination at block 1522 is false, then control continues to block 1524 where controller 399 positions the slider on the next boundary between window sections in the window scroll-bar. Control then continues to block 1526 where controller 399 determines the slider size and horizontal location within the window scroll-bar, as described below under the description for FIG. 19. Referring again to FIG. 15, control then continues to block 1528 where controller 399 moves the previous section's window just off the desktop. Control then returns to block 1510, as previously described above.

If the determination at block 1520 is false, then control continues to block 1605 in FIG. 16 where controller 399 determines whether the event retrieved at block 1510 is an "end" event. An end event would have been sent from the default window procedure previously described above under the description for FIG. 14. Referring again to FIG. 16, if the determination at block 1605 is true, then control continues to block 1610 where controller 399 moves all windows on the desktop back to the original position that they held when the user selected create window scroll-bar icon 430. Controller 399 also removes the window scroll-bar from the display. Control then returns to block 1510 as previously described above.

If the determination in block 1605 is false, the control continues to block 1615 where controller 399 performs the standard window processing for the received event. Control then returns to block 1510, as previously described above.

Figure 17A:
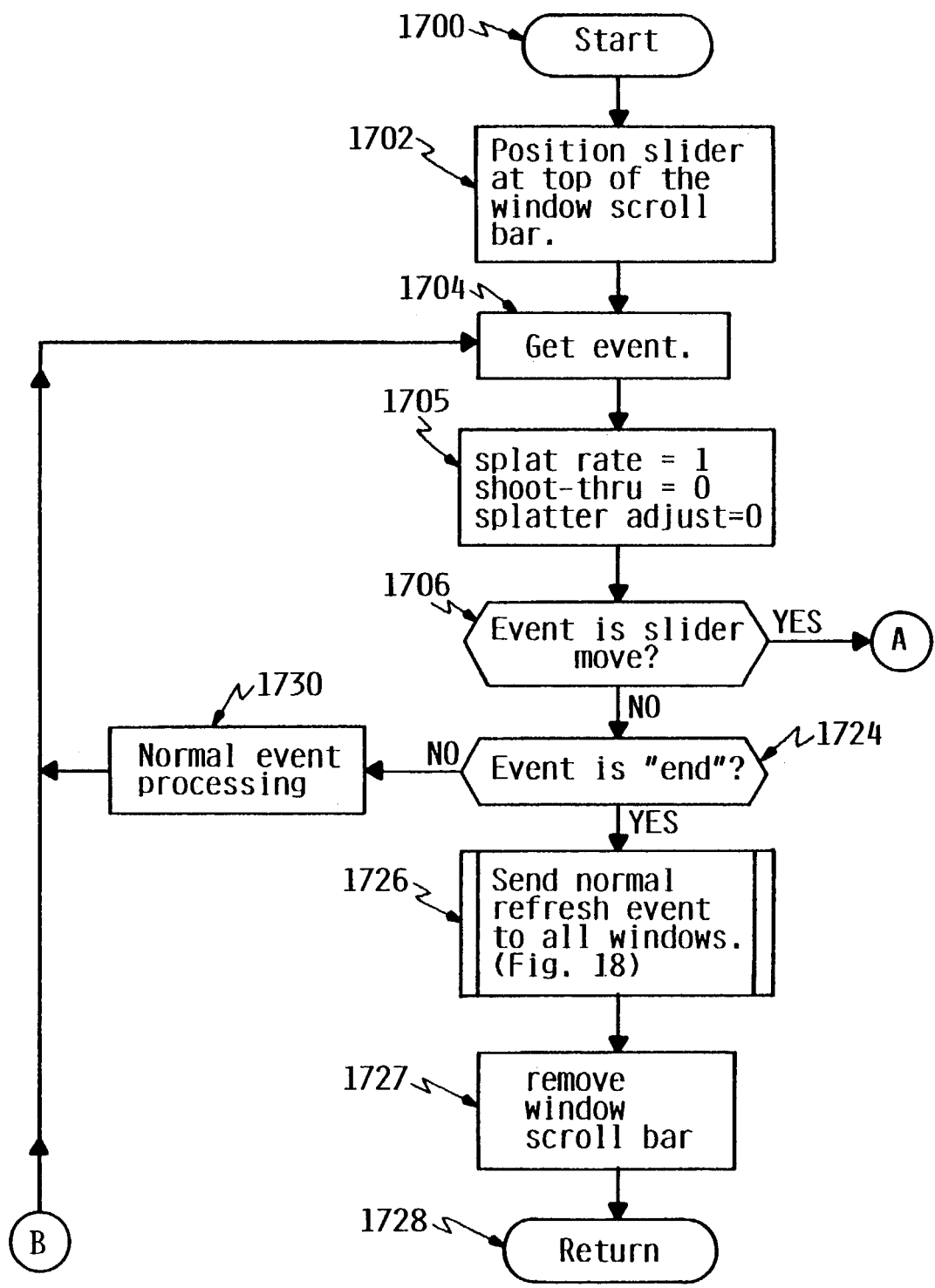
Figure 17B:
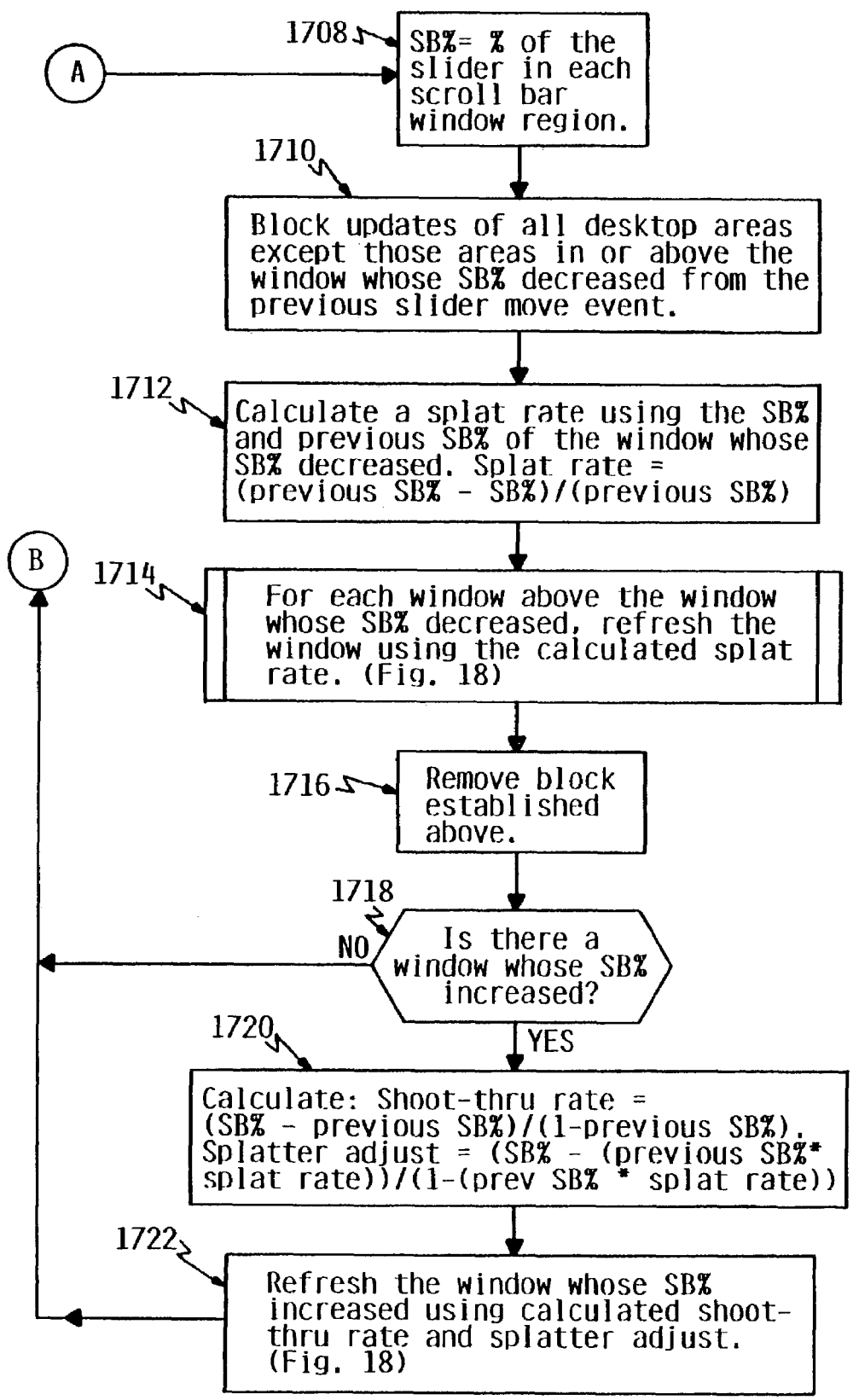

Referring to FIGS. 17A and 17B, there is illustrated a flowchart that describes logic in controller 399 that processes the window scroll-bar in the embodiment that fades a window in and out of view. At block 1700, control begins. Control then continues to block 1702 where controller 399 positions the slider at the top of the scroll bar. Control then continues to block 1704 where controller 399 retrieves the next event. Control then continues to block 1705 where controller 399 initializes the splat-rate variable to one, the shoot-thru variable to zero, and the splatter-adjust variable to zero. Control then continues to block 1706 where controller 399 determines whether the event previously retrieved at block 1704 is a slider-move event.

If the determination at block 1706 is true, then control continues to block 1708 where controller 399 calculates the percentage of the slider that is in each window scroll-bar section. Control then continues to block 1710 where controller 399 blocks subsequent updates from occurring in all desktop areas except for those areas in or above the window whose slider percentage decreased when compared with the previous slider-move event. Control then continues to block 1712 where controller 399 calculates a splat rate using the slider percentage and the previous slider percentage of the window whose slider percentage decreased. The splat rate equals the previous slider-percentage minus the current slider-percentage divided by the previous slider-percentage.

Control then continues to block 1714 where controller 399 refreshes every window above (in the z-order) the window whose slider percentage decreased, using the splat rate calculated in block 1712 above, as further described below under the description for FIG. 18. Thus, the effect of the action of controller 399 in blocks 1710, 1712, and 1714 is to fade out the window whose slider percentage decreased by refreshing the windows on top of it in the z-order. Referring again to FIG. 17B, control then continues to block 1716 where controller 399 removes the update block previously established above at block 1710.

Control then continues to block 1718 where controller 399 determines whether there exits a window whose slider percentage increased. If the determination of block 1718 is true, then control continues to block 1720 where controller 399 calculates a shoot-through rate and a splatter-adjust rate. The shoot-through rate equals the slider percentage for the window whose slider percentage increased minus the previous slider percentage for the window whose slider percentage increased divided by one minus the previous slider percentage of the window whose slider percentage increased. The splatter adjust rate equals (slider-percentage minus (previous slider-percentage times splat rate)) divided by (one minus (previous slider-percentage times splat rate)). Control then continues to block 1722 where controller 399 refreshes the window whose slider percentage increased using the calculated shoot-through rate and splatter-adjust rate, as further described below under the description for FIG. 18. Thus, the effect of the action of controller 399 in blocks 1720 and 1722 is to fade in (brighten) the window whose slider percentage increased. Referring again to FIGS. 17A and 17B, control then returns to block 1704, as previously described above.

If the determination at block 1718 is false, then control continues directly to block 1704, as previously described above.

If the determination at block 1706 is false, then control continues to block 1724 where controller 399 determines whether the received event is an "end" event. If the determination at block 1724 is true, then control continues to block 1726 where controller 399 sends a normal refresh event to all windows in the desktop, as further described below under the description for FIG. 18. Referring again to FIG. 17A, control then continues to block 1727 where controller 399 removes the window scroll-bar from the display. Control then continues to block 1728 where the function returns.

If the determination at block 1724 is false, then control continues to block 1730 where controller 399 performs normal event processing for the received event. Control then returns to block 1704 as previously described above.

Figure 18:
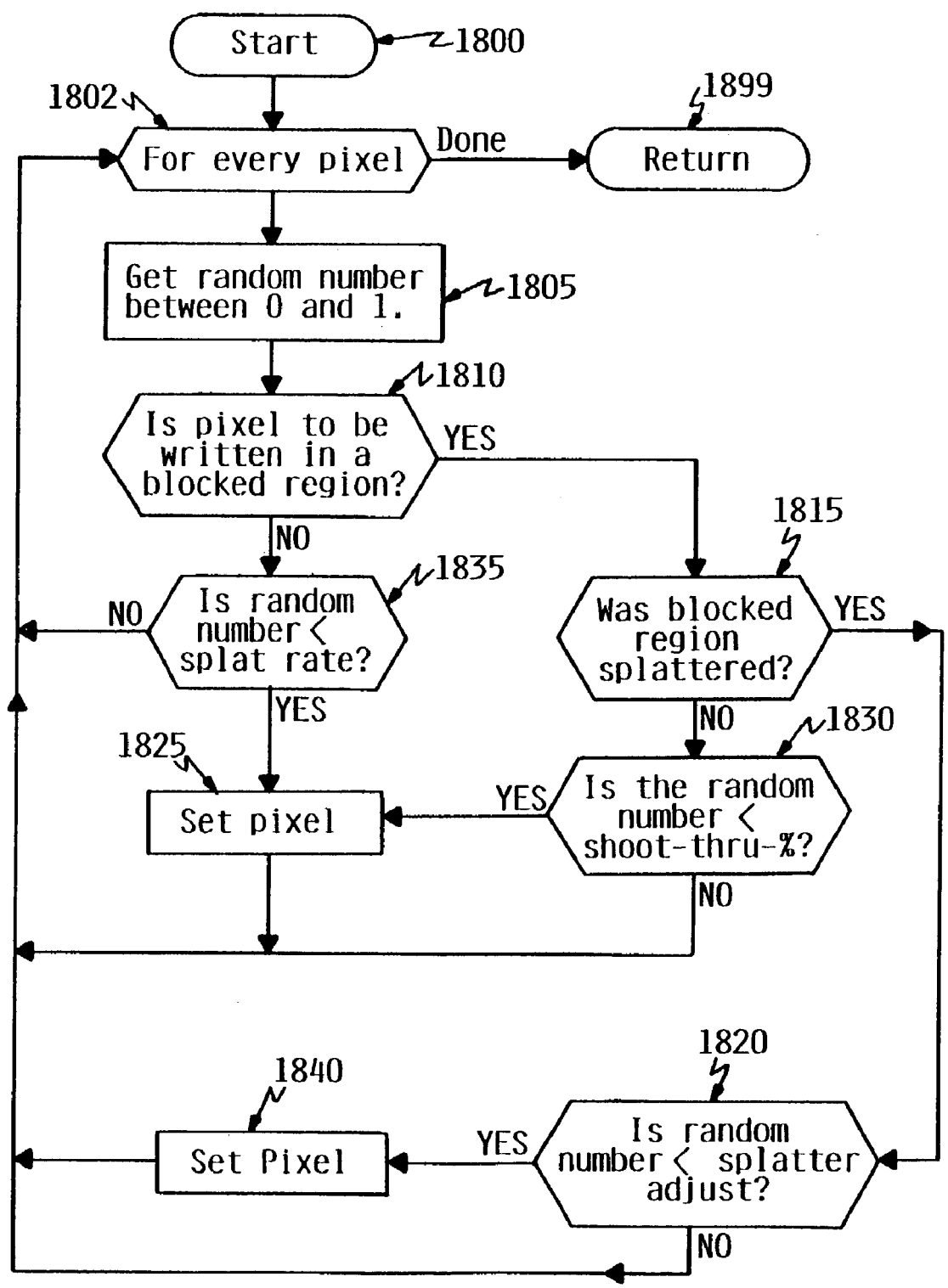

Referring to FIG. 18, there is illustrated a flow chart showing sample logic for a function and controller 399 that refreshes a window on the desktop. The splattering action previously described above under the description for FIG. 17B has as its purpose to fade a window. The window being refreshed, as described in FIG. 18, is not the one being faded, but is the one being used to fade the window below it. At block 1800 control starts. Control then continues to block 1802 where controller 399 enters a loop for every pixel in the window. When there are no more pixels to process, control continues to block 1899 where the function returns.

As long as there are pixels in the window to process, the loop continues from block 1802 to block 1805 where controller 399 retrieves a random number between 0 and 1. Control then continues to block 1810 where controller 399 determines whether the pixel to be written is in a blocked region. (A region can be blocked as previously described above in blocks 1710 of FIG. 17B. A region can also be blocked if it is below another window in the z-order.) Referring again FIG. 18, if the determination at block 1810 is true, then control continues to block 1815 where controller 399 determines whether the blocked region was previously splattered, which would have occurred when a different invocation of the logic of FIG. 18 was called from block 1714, as previously described above under the description for FIG. 17B. Referring again to FIG. 18, if the determination at block 1815 is true, then control continues to block 1820 where controller 399 determines whether the retrieved random number is less than the splatter-adjust rate. (The splatter-adjust rate was previously calculated at block 1720 in FIG. 17B and is used to brighten regions that were inadvertently faded by splattering.) Referring again to FIG. 18, if the determination at block 1820 is false, then control returns to block 1802, as previously described above.

If the determination at block 1820 is true, then control continues to block 1840 where controller 399 sets the pixel. Control then returns to block 1802, as previously described above.

If the determination at block 1815 is false, then control continues to block 1830 where controller 399 determines whether the random number is less than the shoot-through percentage. (The shoot-through percentage was previously calculated above at block 1720 in FIG. 17B.) Referring again to FIG. 18, if the determination at block 1830 is false, then control returns to block 1802, as previously described above.

If the determination at block 1830 is true, then control continues to block 1825 where the pixel is set. Control then returns to block 1802, as previously described above.

If the determination at block 1810 is false, then control continues to block 1835 where controller 399 determines whether the random number retrieved is less than the splat rate. (The splat rate was previously calculated above under the description for block 1712 in FIG. 17B.) If the determination at block 1835 is true, then control continues to block 1825 where controller 399 sets the pixel. Control then returns to block 1802, as previously described above. If the determination at block 1835 is false, then control returns directly to block 1802, as previously described above.

Figure 19:
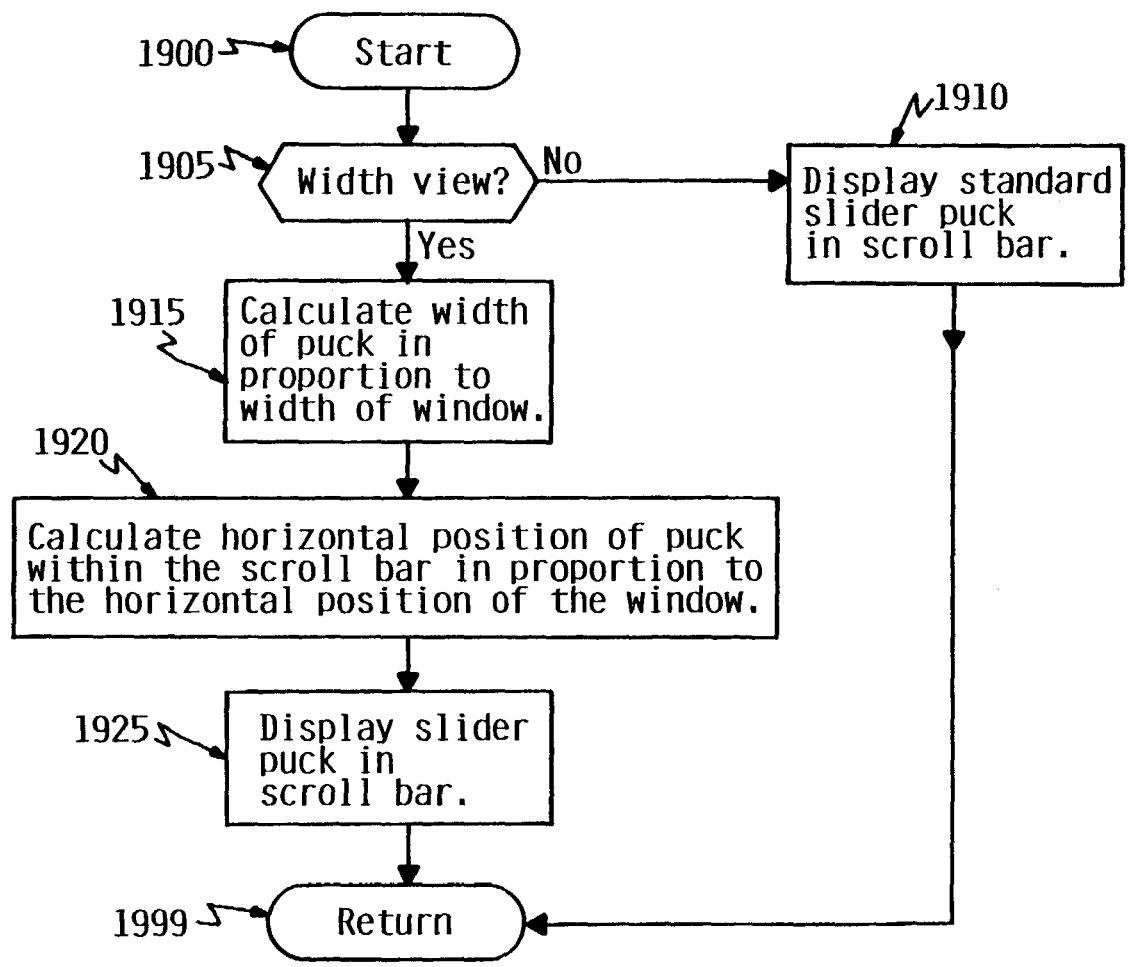

Referring to FIG. 19, there is illustrated a flow chart depicting sample logic that determines the slider size and horizontal location. At block 1900, control begins. Control then continues to block 1905 where controller 399 determines whether the user previously selected width view, as previously described above by button 550 in FIG. 5. Referring again to FIG. 19, if the determination of block 1905 is false, then control continues to block 1910 where controller 399 displays a standard slider on the window scroll-bar. Control then continues to block 1999 where the function returns.

If the determination at block 1905 is true, then control continues to block 1915 where controller 399 calculates the width of the slider in proportion to the width of the window associated with the window scroll-bar section that the slider is in. Control then continues to block 1920 where controller 399 calculates the horizontal position of the slider within the window scroll-bar in proportion to the horizontal position of the associated window within the displayable area of the desktop. Control then continues to block 1925 where controller 399 displays the slider with the calculated size and the calculated horizontal location within the window scroll-bar. Control then continues to block 1999 where the function returns. The operation of the logic of FIG. 19 was previously described above under the description for FIGS. 9, 10, and 11.

While this invention has been described with respect to the preferred and alternative embodiments, it will be understood by those skilled in the art that various changes in detail may be made therein without departing from the spirit, scope, and teaching of the invention. For example, windows may become widely employed in consumer applications such as operator panels for consumer electronics, appliances, and automobiles. Accordingly, the herein disclosed invention is to be limited only as specified in the following claims.

What is claimed is:

1. A method for manipulating a plurality of windows on a display, comprising:
    displaying a window scroll-bar on said display, wherein the window scroll-bar comprises a plurality of sections and a single moveable slider common to all of said sections, each section being associated with a different respective window of said plurality of respective windows on the display;

moving said slider within said window scroll-bar responsive to interactive user input; and responsive to moving said slider within any section of said window scroll-bar, moving at least one of a horizontal position on said display or a vertical position on said display of the respective window associated with the section in which the slider is located;

wherein said step of displaying a window scroll-bar further comprises creating a respective size of each of the plurality of sections, wherein the section size is proportional to use of the respective, associated window.

2. The method of claim 1, wherein said step of moving at least one of a horizontal position or a vertical position of the respective window further comprises: moving the associated window toward the closest boundary of the display as the slider moves from the top of the section to the bottom of the section.

3. The method of claim 2, wherein the boundary is a corner of the display.

4. The method of claim 2, wherein the boundary is an edge of the display.

5. The method of claim 2, wherein said step of moving at least one of a horizontal position or a vertical position of the respective window further comprises: moving the associated window toward the closest boundary in proportion to the slider moving within the section.

6. The method of claim 1, wherein each of said plurality of sections contains at least one of the set consisting of: (a) a color of the respective associated window, (b) a title of the respective associated window, and (c) an icon representing the respective associated window.

7. The method of claim 1, wherein said step of displaying a window scroll-bar further comprises ordering the plurality of sections in the window scroll-bar using at least one of the set consisting of: (a) last use of the respective associated window, (b) most use of the respective associated window, (c) time since activation of the respective associated window, and (d) user choice.

8. The method of claim 1, wherein said step of displaying a window scroll-bar further comprises changing a z-order of the plurality of windows to match the order of the plurality of sections in the window scroll-bar.

* * * * *